(12) United States Patent
Kazerooni et al.

(10) Patent No.: US 9,610,208 B2
(45) Date of Patent: Apr. 4, 2017

(54) DEVICE AND METHOD FOR DECREASING ENERGY CONSUMPTION OF A PERSON BY USE OF A LOWER EXTREMITY EXOSKELETON

(71) Applicant: Ekso Bionics, Inc., Richmond, CA (US)

(72) Inventors: Homayoon Kazerooni, Berkeley, CA (US); Kurt Amundson, Berkeley, CA (US); Nathan Harding, Oakland, CA (US)

(73) Assignee: Ekso Bionics, Inc., Richmond, CA (US)

(*) Notice: Subject to any disclaimer, the term of this patent is extended or adjusted under 35 U.S.C. 154(b) by 348 days.

(21) Appl. No.: 13/709,859

(22) Filed: Dec. 10, 2012

(65) Prior Publication Data

US 2013/0102935 A1  Apr. 25, 2013

Related U.S. Application Data

(63) Continuation of application No. 12/468,595, filed on May 19, 2009, now Pat. No. 8,945,028.

(Continued)

(51) Int. Cl.
*A61H 3/00* (2006.01)
*B25J 9/00* (2006.01)
*A61H 3/06* (2006.01)

(52) U.S. Cl.
CPC .............. *A61H 3/00* (2013.01); *A61H 3/061* (2013.01); *B25J 9/0006* (2013.01); *A61H 3/008* (2013.01)

(58) Field of Classification Search
CPC  A61H 3/008; A61H 3/061; A61H 3/00; B25J 9/0006
(Continued)

(56) References Cited

U.S. PATENT DOCUMENTS 406,328 A  7/1889  Yagn
420,178 A  1/1890  Yagn
(Continued)

OTHER PUBLICATIONS

Chu, A. (Apr. 2003). "Design Overview of 1st Generation Exoskeleton," Master of Science Thesis submitted to the Mechanical Engineering Department at the University of California, Berkeley, pp. 1-62.

(Continued)

*Primary Examiner* — Quang D Thanh
(74) *Attorney, Agent, or Firm* — Diederiks & Whitelaw, PLC

(57) ABSTRACT

A lower extremity exoskeleton, configurable to be coupled to a person, includes: leg supports configurable to be coupled to the person's lower limbs and designed to rest on the ground during stance phases, with each leg support having a thigh link and a shank link; two knee joints, each configured to allow flexion and extension between respective shank and thigh links; an exoskeleton trunk configurable to be coupled to the person's upper body, rotatably connectable to the thigh links of the leg supports, allowing for the flexion and extension between the leg supports and the exoskeleton trunk; two hip actuators configured to create torques between the exoskeleton trunk and the leg supports; and at least one power unit capable of providing power to the hip actuators. In use, power is supplied to the hip actuators in an amount to reduce the energy consumed by a user during a walking cycle.

19 Claims, 40 Drawing Sheets

Related U.S. Application Data

(60) Provisional application No. 61/071,823, filed on May 20, 2008.

(58) Field of Classification Search
USPC ..... 601/5, 23, 24, 33, 34, 35; 602/5, 16, 23; 128/898
See application file for complete search history.

(56) References Cited

U.S. PATENT DOCUMENTS

| | | |
|---|---|---|
| 420,179 A | 1/1890 | Yagn |
| 438,830 A | 10/1890 | Yagn |
| 440,684 A | 11/1890 | Yagn |
| 539,872 A | 5/1895 | Kheiralla |
| 807,908 A | 12/1905 | Bradstreet |
| 979,243 A | 12/1910 | Anderson |
| 1,308,675 A | 7/1919 | Kelley |
| 2,010,482 A | 8/1935 | Cobb |
| 2,305,291 A | 12/1942 | Filippi |
| 2,573,866 A | 11/1951 | Murphy |
| 4,422,453 A | 12/1983 | Salort |
| 4,557,257 A | 12/1985 | Fernandez et al. |
| 4,647,004 A | 3/1987 | Bihlmaier |
| 4,872,665 A | 10/1989 | Chareire |
| 4,946,156 A | 8/1990 | Hart |
| 5,016,869 A | 5/1991 | Dick et al. |
| 5,020,790 A | 6/1991 | Beard et al. |
| 5,282,460 A | 2/1994 | Boldt |
| 5,476,441 A | 12/1995 | Durfee et al. |
| 5,658,242 A | 8/1997 | McKay et al. |
| 5,662,693 A | 9/1997 | Johnson et al. |
| 5,704,945 A | 1/1998 | Wagner et al. |
| 5,888,212 A | 3/1999 | Petrofsky et al. |
| 5,961,476 A | 10/1999 | Betto et al. |
| 6,171,272 B1 | 1/2001 | Akita et al. |
| 6,422,329 B1 | 7/2002 | Kazerooni et al. |
| 6,821,233 B1 | 11/2004 | Colombo et al. |
| 6,966,882 B2 | 11/2005 | Horst |
| 7,048,707 B2 | 5/2006 | Schwenn et al. |
| 7,153,003 B2 | 12/2006 | Nakamura |
| 7,153,242 B2 | 12/2006 | Goffer |
| 7,190,141 B1 | 3/2007 | Ashrafiuon et al. |
| 7,198,071 B2 | 4/2007 | Bisbee, III et al. |
| 7,217,247 B2 | 5/2007 | Dariush et al. |
| 7,313,463 B2 | 12/2007 | Herr et al. |
| 7,390,309 B2 | 6/2008 | Bariush |
| 7,393,335 B2 | 7/2008 | Carvey et al. |
| 7,404,782 B2 | 7/2008 | Kudoh et al. |
| 7,416,538 B2 | 8/2008 | Katoh et al. |
| 7,481,742 B2 | 1/2009 | Katoh et al. |
| 7,524,297 B2 | 4/2009 | Shimada et al. |
| 7,537,573 B2 | 5/2009 | Horst |
| 7,549,969 B2 | 6/2009 | Van Den Bogert |
| 7,559,909 B2 | 7/2009 | Katoh et al. |
| 7,628,766 B1 | 12/2009 | Kazerooni et al. |
| 7,713,217 B2 | 5/2010 | Ikeuchi et al. |
| 7,780,616 B2 | 8/2010 | Katoh et al. |
| 7,785,279 B2 | 8/2010 | Sankai |
| 7,798,983 B2 | 9/2010 | Katoh et al. |
| 7,883,546 B2 | 2/2011 | Kazerooni et al. |
| 7,947,004 B2 | 5/2011 | Kazerooni et al. |
| 7,963,932 B2 | 6/2011 | Ashihara et al. |
| 8,057,410 B2 | 11/2011 | Angold et al. |
| 2002/0094919 A1 | 7/2002 | Rennex et al. |
| 2004/0116839 A1 | 6/2004 | Sarkodie-Gyan |
| 2005/0059908 A1 | 3/2005 | Bogert |
| 2006/0130594 A1* | 6/2006 | Ikeuchi ............... A61F 5/0102 602/23 |
| 2006/0249315 A1 | 11/2006 | Herr et al. |
| 2006/0270951 A1* | 11/2006 | Ikeuchi ............... 601/5 |
| 2006/0276728 A1* | 12/2006 | Ashihara et al. ............... 601/5 |
| 2007/0043449 A1 | 2/2007 | Herr et al. |
| 2007/0123997 A1* | 5/2007 | Herr ............... A61F 2/60 623/27 |
| 2007/0162152 A1 | 7/2007 | Herr et al. |
| 2008/0009771 A1 | 1/2008 | Perry et al. |
| 2008/0154165 A1 | 6/2008 | Ashihara et al. |
| 2008/0234608 A1* | 9/2008 | Sankai ............... A61B 5/04888 601/5 |
| 2009/0014042 A1* | 1/2009 | Ashihara et al. ............... 601/5 |
| 2009/0292369 A1 | 11/2009 | Kazerooni et al. |
| 2010/0010641 A1 | 1/2010 | Kazerooni et al. |
| 2010/0094185 A1 | 4/2010 | Amundson et al. |
| 2010/0094188 A1* | 4/2010 | Goffer et al. ............... 602/23 |
| 2010/0204627 A1 | 8/2010 | Kazerooni et al. |

OTHER PUBLICATIONS

Mori, Y. (Apr. 2004). "Development of Straight Style Transfer Equipment for Lower Limbs Disabled," *Proceedings of the 2004 IEEE International Conference on Robotics and Automation*, New Orleans, Louisiana, pp. 2486-2491.

Morris, S. et al. (Oct. 2002). "Shoe-Integrated Sensor System for Wireless Gait Analysis and Real-Time Feedback," *Proceedings of the Second Joint EMBS/BMES Conference*, Houston, Texas, pp. 2468-2469.

Pratt, J. E. et al. (Apr. 2004). "The RoboKnee: An Exoskeleton for Enhancing Strength and Endurance During Walking," *Proceedings of the IEEE International Conference on Robotics and Automation*, New Orleans, Louisiana, pp. 2430-2435.

Racine, J. L. C. (2003). "Control of a Lower Exoskeleton for Human Performance Amplification," PhD Thesis submitted to the Universit of California, Berkeley, pp. 1-832.

Van Den Bogert, A. J. (Oct. 2003). "Exotendons for Assistance of Human Locomotion," *Biomedical Engineering Online* 2(17):1-8.

Zoss, A. (2003). "Mechanical Design Implementation of an Exoskeleton," Master of Science Thesis submitted to the University of California, Berkeley, pp. 1-140.

Johnson, D., et al., "*Development of a Mobility Assist for the Paralyzed, Amputee, and Spastic Patient*", Proceedings of the Fifteenth Southern Biomedical Engineering Conference, IEEE, pp. 67-70, Dayton, Ohio, Mar. 1996.

Yamamoto, K., et al., "*Development of Power Assisting Suit for Assisting Nurse Labor*", JSME International Journal, Series C, vol. 45, No. 3, pp. 703-711, Sep. 2002.

Yamamoto, K., et al., "*Development of Power Assisting Suit (Miniaturization of Supply System to Realize Wearable Suit)*", JSME International Journal, Series C, vol. 46, No. 3, pp. 923-930, Sep. 2003.

Vukobratovic, M., et al., "*Development of Active Anthropomorphic Exoskeletons*", Medical and Biological Engineering, pp. 66-80, Jan. 1974.

Misuraca, J., et al., "*Lower Limb Human Muscle Enhancer*", Proceedings of the Symposium on Advances in Robot Dynamics and Control, ASME International Mechanical Engineering Congress and Exposition (IMECE), New York, New York, pp. 1-7, Nov. 2001.

Belforte, G., et al., "*Pneumatic Active Gait Orthosis*", Mechatronics, vol. 11, No. 3, pp. 301-323, Apr. 2001.

Kasaoka, K., et al., "*Predictive Control Estimating Operator's Intention for Stepping-up Motion by Exoskeleton Type Power Assist System HAL*", Proceedings of the IEEE/RSJ International Conference on Intelligent Robots and Systems (IROS), vol. 3, pp. 1578-1583, Maui, Hawaii, Nov. 2001.

Kawamoto, H., et al., "*Comfortable Power Assist Control Method for Walking Aid by HAL-3*", Proceedings of the IEEE International Conference on Systems, Man, and Cybernetics (SMC), vol. 4, Hammamet, Tunisia, Oct. 2002.

Lee, S., et al., "*Power Assist Control for Walking Aid with HAL-3 Based on EMG and Impedance Adjustment around Knee Joint*", Proceedings of the IEEE/RSJ International Conference on Intelligent Robots and Systems (IROS), vol. 2, pp. 1499-1504, Lausanne, Switzerland, 2002.

(56) References Cited

OTHER PUBLICATIONS

Kawamoto, H., et al., "*Power Assist System HAL-3 for Gait Disorder Person*", Lecture Notes in Computer Science (LNCS), vol. 2398, Proceedings of the Eighth International Conference on Computers Helping People with Special Needs (ICCHP), pp. 196-203, Berlin, Germany, 2002.
Irby, S., et al., "*Automatic Control Design for a Dynamic Knee-Brace System*", IEEE Transactions on Rehabilitation Engineering, vol. 7, No. 2, pp. 135-139, Jun. 1999.
Ferris, D., et al., "*An Ankle-Foot Orthosis Powered by Artificial Muscles*", Proceedings of the 25$^{th}$ Annual Meeting of the American Society of Biomechanics, San Diego, California, Aug. 2001.
Naruse, K., et al., "*Design of Compact and Lightweight Wearable Power Assist Device*", Proceedings of Asme International Mechanical Engineering Congress and Exposition (IMECE), Washington DC, pp. 1-8, Nov. 2003.
Harley, J.A., "*Design and Construction of an Underactuated Assistive Walking Device*", Graduate Thesis, UC-Berkeley Mechanical Engineering Dept., Aug. 1995.
Zin Min Lim, Michael, "*An Analysis on the Performance of an Underactuated Lower Extremity Enhancer*", Graduate Thesis, UC-Berkeley Mechanical Engineering Dept., Dec. 2000.
Clark, D.C., et al., "*Exploratory Investigation of the Man Amplifier Concept*", Technical Documentary Report No. AMRL-TDR-62-89, United States Air Force, Wright-Patterson Air Force Base, Ohio, Aug. 1962.
"*Machine Augmentation of Human Strength and Endurance: Hardiman I Prototype Project*", Report for ONR Contract No. 00014-66-00051, Prepared by General Electric Company, Schenectady, New York, Jul. 1969.
"*Research and Development Prototype for Machine Augmentation of Human Strength and Endurance: Hardiman I Project*", Report for ONR Contract No. N00014-66-00051, Prepared by General Electric Company, Schenectady, New York, May 1971.
"*Exoskeleton Prototype Project*", Final Report on Phase 1, Contract No. N00014-66-C0051, Prepared by General Electric Company, Schenectady, New York, Oct. 1966.
Mosher, R.S., "*Handyman to Hardiman*", Automotive Engineering Congress, Society of Automotive Engineers, Detroit, Michigan, Jan. 1967.
Arroyo, P., "*Design of a Minimally Actuated Assistive Walking Device*", Graduate Thesis, UC-Berkeley Mechanical Engineering Dept., Dec. 1998.
Rehnmark, F.L., "*Dynamic Simulation and Design of a Powered Underactuated Assistive Walking Device*", Graduate Thesis, UC-Berkeley Mechanical Engineering Dept., May 1997.
Walsh C.J., et al., "*Development of a Lightweight, Underactuated Exoskeleton for Load-Carrying Augmentation*", Proceedings of the 2006 IEEE International Conference on Robotics and Automation, pp. 3485-3491, Orlando, Florida, May 2006.
Croshaw, P.F., "*Hardiman I Arm Test: Hardiman I Prototype Project*", General Electric Company, Schenectady, New York, Dec. 1969.
Dollar, A.M., et al., "*Lower-Extremity Exoskeletons and Active Orthoses: Challenges and State of the Art*", IEEE Transactions on Robotics, vol. 24, No. 1, pp. 1-15, Feb. 2008.
Walsh, C.J., et al., "*An Autonomous, Underactuated Exoskeleton for Load-Carrying Augmentation*", Proceedings of the 2006 IEEE/RSJ International Conference on Intelligent Robots and Systems, pp. 1410-1415, Beijing, China, Oct. 9-15, 2006.
Kazerooni, H., et al., "*On the Control of Berkeley Lower Extremity Exoskeleton (BLEEX)*", Proc. of the 2005 IEEE International Conference on Robotics and Automation, pp. 4364-4371, Barcelona, Spain, Apr. 2005.
Endo, K., et al., "*A Quasi-Passive Model of Human Leg Function in Level-Ground Walking*", Proceedings of the 2006 IEEE/RSJ International Conference on Intelligent Robots and Systems, pp. 4935-4939, Beijing, China, Oct. 9-15, 2006.
Agrawal, A., et al., "*Design of a Two Degree-of-Freedom Ankle-Foot Orthosis for Robotic Rehabilitation*", Proceedings of the 2005 IEEE 9$^{th}$ International Conference on Rehabilitation Robotics, pp. 41-44, Chicago, Illinois, Jun. 28-Jul. 1, 2005.
Bharadwaj, K., et al., "*Design of a Robotic Gait Trainer Using Spring Over Muscle Actuators for Ankle Stroke Rehabilitation*", Journal of Biomechanical Engineering, vol. 127, pp. 1009-1013, Nov. 2005.
Sawicki, G.S., et al., "*Powered lower Limb Orthoses: Applications in Motor Adaptation and Rehabilitation*", Proceedings of the 2005 IEEE 9$^{th}$ International Conference on Rehabilitation Robotics, pp. 206-211, Chicago, Illinois, Jun. 28-Jul. 1, 2005.
Ferris, D.P., et al., "*An Improved Powered Ankle-Foot Orthosis using Proportional Myoelectric Control*", Gait & Posture, vol. 23, pp. 425-428, 2006.
Vukobratovic, M., et al., "*Humanoid Robots*", In: The Mechanical Systems Design Handbook: Modeling, Measurement, and Control (Y. Hurmuziu, ed), Chapter 27, CRC press, 2002.
Saito, Y., et al., "*Development of Externally Powered Lower Limb Orthosis with Bilaterial-Servo Actuator*", Proceedings of the 2005 IEEE 9$^{th}$ International Conference on Rehabilitation Robotics, pp. 394-399, Chicago, Illinois, Jun. 28-Jul. 1, 2005.
Low, K.H., et al., "*Development of NTU Wearable Exoskeleton System for Assistive Technologies*", Proceedings of the IEEE International Conference on Mechatronics & Automation, pp. 1099-1106, Niagara Falls, Canada, Jul. 2005.
Liu, X., et al., "*Development of a Lower Extremity Exoskeleton for Human Performance Enhancement*", Proceedings of the 2004 IEEE/RSJ International Conference on Intelligent Robots and Systems, pp. 3889-3894, Sendai, Japan, Sep. 28,-Oct. 2, 2004.
Walsh, C.J., et al., "*A Quasi-Passive Leg Exoskeleton for Load-Carrying Augmentation*", WSPC/Instruction File, International Journal of Humanoid Robotics, vol. 14, No. 55, Mar. 25, 2007.
Walsh, C.J., "*Biomimetic Design of an Under-Actuated Leg Exoskeleton for Load-Carrying Augmentation*", Graduate Thesis, Trinity College Dublin, Dept. of Mechanical Engineering, Feb. 2006.
Valiente, A., "*Design of a Quasi-Passive Parallel Leg Exoskeleton to Augment Load Carrying for Walking*", Graduate Thesis, Massachusetts Institute of Technology, Dept. of Mechanical Engineering, Aug. 2005.
Ferris, D.P., et al., "*Powered Lower Limb Orthoses for Gait Rehabilitation*", Top Spinal Cord Injury Rehabilitation, vol. 11, No. 2, pp. 34-49, 2005.
Rabischong, E., et al., "*Control and Command of a Six Degrees of Freedom Active Electrical Orthosis for Paraplegic Patient*", Proceedings of IEEE International Workshop on Intelligent Robots and Systems, pp. 987-991, 1990.
Kosso, E.V., "*A Minimum Energy Exoskeleton*", Proceedings of the 1973 Camahan Conference on Electronic Prosthetics, pp. 86-89, 1973.
Kawamoto, H., et al., "*Power Assist Method for HAL-3 Estimating Operator's Intention Based on Motion Information*", Proceedings of the 2003 IEEE International Workshop on Robot and Human Interactive Communication, pp. 67-72, Millbrae, California, Oct. 31,-Nov. 2, 2003.
Hollander, K., et al., "*An Efficient Robotic Tendon for Gait Assistance*", Journal of Biomechanical Engineering, vol. 128, No. 5, pp. 788-791, Oct. 2006.
Jaukovic, N.D., "*Active Peroneal Orthosis*", Proceedings of the International Symposium on External Control of Human Extremities, pp. 13-20, 1981.
Popovic, D., et al., "*Powered Hybrid Assistive System*", Proceedings of the International Symposium on External Control of Human Extremities, pp. 177-186, 1990.
Durfee, W.K., et al., "*Preliminary Design and Simulation of a Pneumatic, Stored-Energy, Hybrid Orthosis for Gait Restoration*", Proceedings of the 2004 ASME International Mechanical Engineering Congress, Anaheim, CA, Nov. 13-20, 2004.
Gregorczyk, K.N., et al., "*The Effects of a Lower Body Exoskeleton Load Carriage Assistive Device on Oxygen Consumption and Kinematics During Walking with Loads*", 25$^{th}$ Army Science Conference, Orlando, FL, Nov. 27-30, 2006.
Heese, S., et al., "*Upper and Lower Extremity Robotic Devices for Rehabilitation and for Studying Motor Control*", Current Opinion in Neurology, vol. 16, No. 6, pp. 705-710, Dec. 2003.

(56) References Cited

OTHER PUBLICATIONS

Kawamoto, H., et al., "*Power Assist Method for HAL-3 Using EMG-Based Feedback Controller*", Proceedings of the IEEE International Conference on Systems, Man, and Cybernetics, pp. 1648-1653, 2003.

Kazerooni, H., et al., "*The Berkeley Lower Extremity Exoskeletons*", ASME Journal of Dynamics Systems, Measurements and Control, vol. 128, pp. 14-25, Mar. 2006.

Zoss, A., et al., "*Biomechancial Design of the Berkeley Lower Extremity Exoskeleton (BLEEX)*", IEEE/ASME Transactions on Mechatronics, vol. 11, No. 2, pp. 128-138, Apr. 2006.

Kazerooni, H., et al., "*That Which Does Not Stabilize, Will Only Make Us Stronger*", The International Journal of Robotics Research, vol. 26, No. 1, pp. 75-89, Jan. 2007.

Hill, J.W., "*Hydraulically Powered Lower Limb Orthosis*", In: Morecki, A. & Bianchi, K. (eds) Theory and Practice of Robots and Manipulators, Proceedings of RoManSy 1986-6$^{th}$ CISM-IFToMM Symposium, pp. 182-192, The MIT Press, Boston, 1987.

Lazarevic, S.R., et al., "*Logic Control of Partial Active Orthoses, via Real Time Computing System*", Proceedings of the 5$^{th}$ International Symposium on External Control of Human Extremities, pp. 247-257, Dubrovnik, Yugoslavia, 1975.

Kuo, A.D., "*Energetics of Actively Powered Locomotion Using the Simplest Walking Model*", Journal of Biomechanical Engineering, vol. 124, pp. 113-120, Feb. 2002.

Donelan, J.M., et al., "*Simultaneous Positive and Negative External Mechanical Work in Human Walking*", Journal of Biomechanics, vol. 35, pp. 117-124, 2002.

Crowell, H.P., et al., "*Exoskeleton Power and Torque Requirements Based on Human Biomechanics*", Army Research Laboratory, ARL-TR-2764, Nov. 2002.

Griffin, T.M., et al., "*Walking in Simulated Reduced Gravity: Mechanical Energy Fluctuations and Exchange*", The Journal of Applied Physiology, vol. 86, pp. 383-390, Jan. 1999.

Vukobratovic, M., et al., "*New Model of Autonomous "Active Suit" for Distrophic Patients*", Proceedings of the International Symposium on External Control of Human Extremities, pp. 33-42, 1981.

Rabischong, J.P., et al., "*The Amoll Project*", Proc. of the 5$^{th}$ Int. Symposium on External Control of Human Extremities, ETAN, Dubrovnik, Yugoslavia, 1975.

Grundman, J., et al., "*Computer Control of Multi-Task Exoskeleton for Paraplegics*", In: Morecki, A. & Bianchi, K. (eds) Theory and Practice of Robots and Manipulators, Proceedings of RoManSy 1986—6$^{th}$ CISM-IFToMM Symposium, pp. 233-240, The MIT Press, Boston, MA, 1987.

Lee, S., et al., "*Power Assist Control for Leg with HAL-3 Based on Virtual Torque and Impedance Adjustment*", Proceedings of 2002 IEEE Conference on Systems, Man and Cybernetics, vol. 4, pp. 69, Oct. 2002.

Jinger, S., et al., "*Energy Cost and Muscular Activity Required for Propulsion During Walking*", J. Applied Physiology, No. 94, pp. 1766-1772, 2003.

\* cited by examiner

DEVICE AND METHOD FOR DECREASING ENERGY CONSUMPTION OF A PERSON BY USE OF A LOWER EXTREMITY EXOSKELETON

CROSS-REFERENCE TO RELATED APPLICATIONS

This application represents a continuation of pending U.S. patent application Ser. No. 12/468,595, filed May 19, 2009 which claims the benefit of U.S. Provisional Application No. 61/071,823 entitled DEVICE AND METHOD FOR DECREASING ENERGY CONSUMPTION OF A PERSON BY USE OF A LOWER EXTREMITY EXOSKELETON, filed May 20, 2008.

BACKGROUND OF THE INVENTION

Field of the Invention

The present invention relates generally to the field of lower extremity exoskeletons and, more particularly, to the field of lower extremity exoskeletons that decrease their wearer's energy consumption.

Discussion of the Prior Art

In a wide variety of situations, people of ordinary ability often consume a great deal of energy when walking or carrying a load. One attempt to improve load carrying ability is set forth in the paper entitled "A QUASI-PASSIVE LEG EXOSKELETON FOR LOAD-CARRYING AUGMENTATION", C. J. Walsh, K. Endo, and H. Herr, International Journal of Humanoid Robotics, 2007. However, the quasi-passive exoskeleton taught by Walsh et al. increases its wearer's oxygen consumption. More specifically, the exoskeleton described has no actuation and power unit and therefore will not be able to transfer power from the exoskeleton to the person. This means that this type of system, regardless of the location and strength of its springs, will not decrease its wearer's energy expenditure. Since oxygen consumption is proportional to energy expended, a wearer's oxygen consumption will not be decreased.

An article published by Popular Science Magazine (May 2008) describes a powered exoskeleton system designed and built by Sarcos, that is controlled by a method called "get out of the way". This method measures the forces and torques a wearer exerts onto the exoskeleton and drives the exoskeleton based on these measurements. This "get out of the way" control method has been extensively used in control of intelligent assist devices. See U.S. Pat. Nos. 6,299,139, 6,386,513, and 6,886,812. However, the "get out of the way" control method will not reduce a wearer's energy expenditure because the force from the exoskeleton onto the wearer is in the opposite direction to the wearer's motion and in fact increases the wearer's energy expenditure.

Based on the above, opportunities exist to provide a general purpose exoskeleton device that will decrease the wearer's energy consumption while the device is worn. Providing an exoskeleton that decreases the energy consumption of its wearer would allow a wearer to walk and carry heavy objects, while reducing the wearer's energy expenditure. In particular, this invention covers various embodiments of exoskeleton devices that decrease their wearers' energy expenditure during a stance phase.

SUMMARY OF THE INVENTION

The opportunities described above are addressed in several embodiments of a lower extremity exoskeleton, wearable by a person. The lower extremity exoskeleton described here is configurable to be coupled to a person and, among other components, comprises: two leg supports configurable to be coupled to the person's lower limbs; two knee joints, each of which is configured to allow flexion and extension between a respective shank link and respective thigh link; an exoskeleton trunk, which is configurable to be coupled to the person's upper body and is rotatably connectable to the thigh links of the leg supports, allowing for the flexion and extension between the leg supports and the exoskeleton trunk; two hip actuators, which are configured to create torques between the exoskeleton trunk and leg supports; and at least one power unit, which is capable of providing power to the hip actuators, among other components. In operation, when the lower extremity exoskeleton is worn by the person, one leg support is in the stance phase and the other leg support is in the swing phase, the power unit is configured to cause the hip actuator of the leg support in the stance phase to create a torque profile such that the energy supplied by the power unit to the hip actuator of the leg support in stance phase is greater than the energy required to move the exoskeleton trunk and the leg support in stance phase through the same trajectory when not worn by the person.

BRIEF DESCRIPTION OF THE DRAWINGS

These and other features, aspects, and advantages of the present invention will become better understood when the following detailed description is read with reference to the accompanying drawings, in which like characters represent like parts throughout the drawings, wherein.

DETAILED DESCRIPTION OF THE INVENTION

Figure 1:
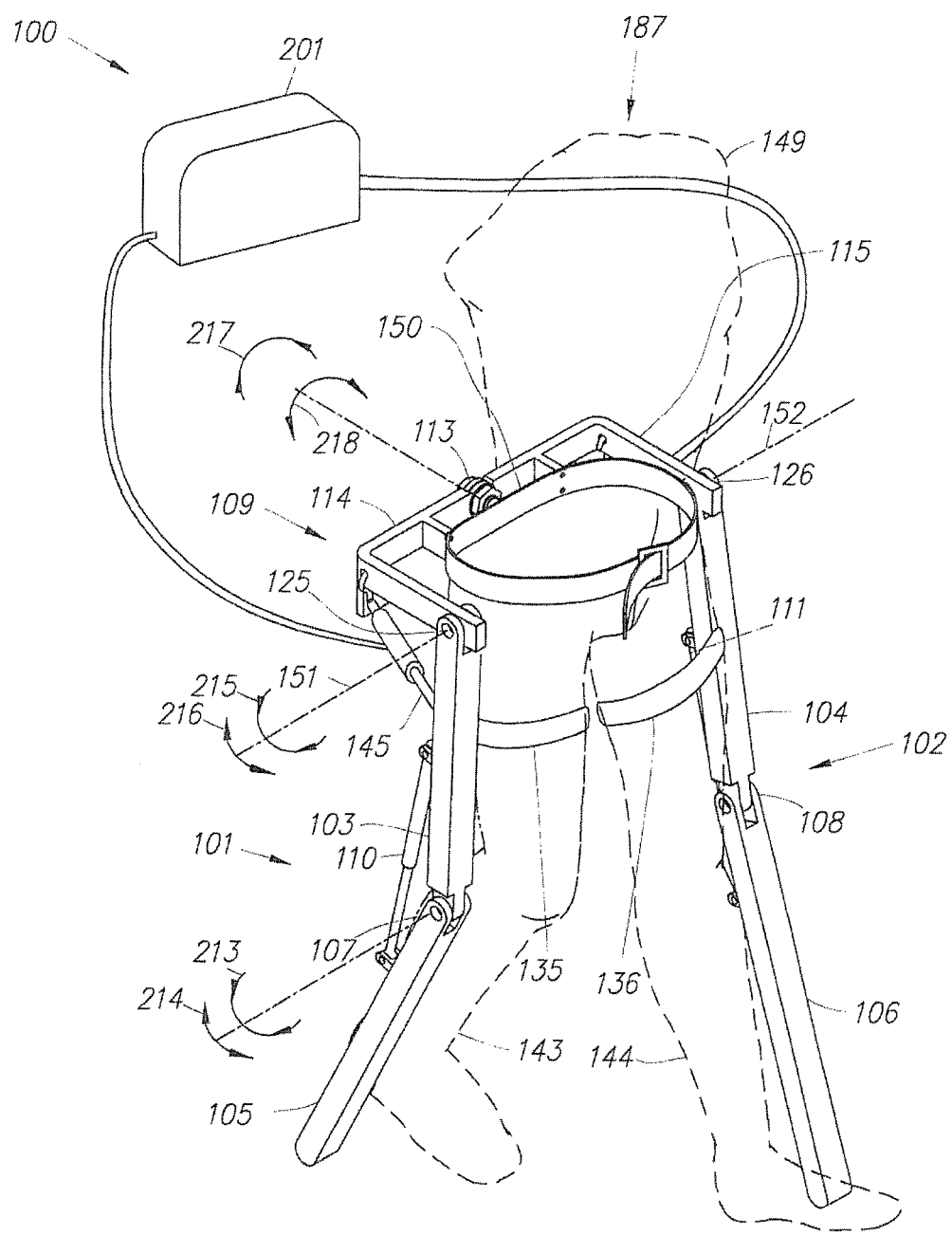
FIG. 1 is a front perspective drawing of an exoskeleton of the present invention.
Figure 2:
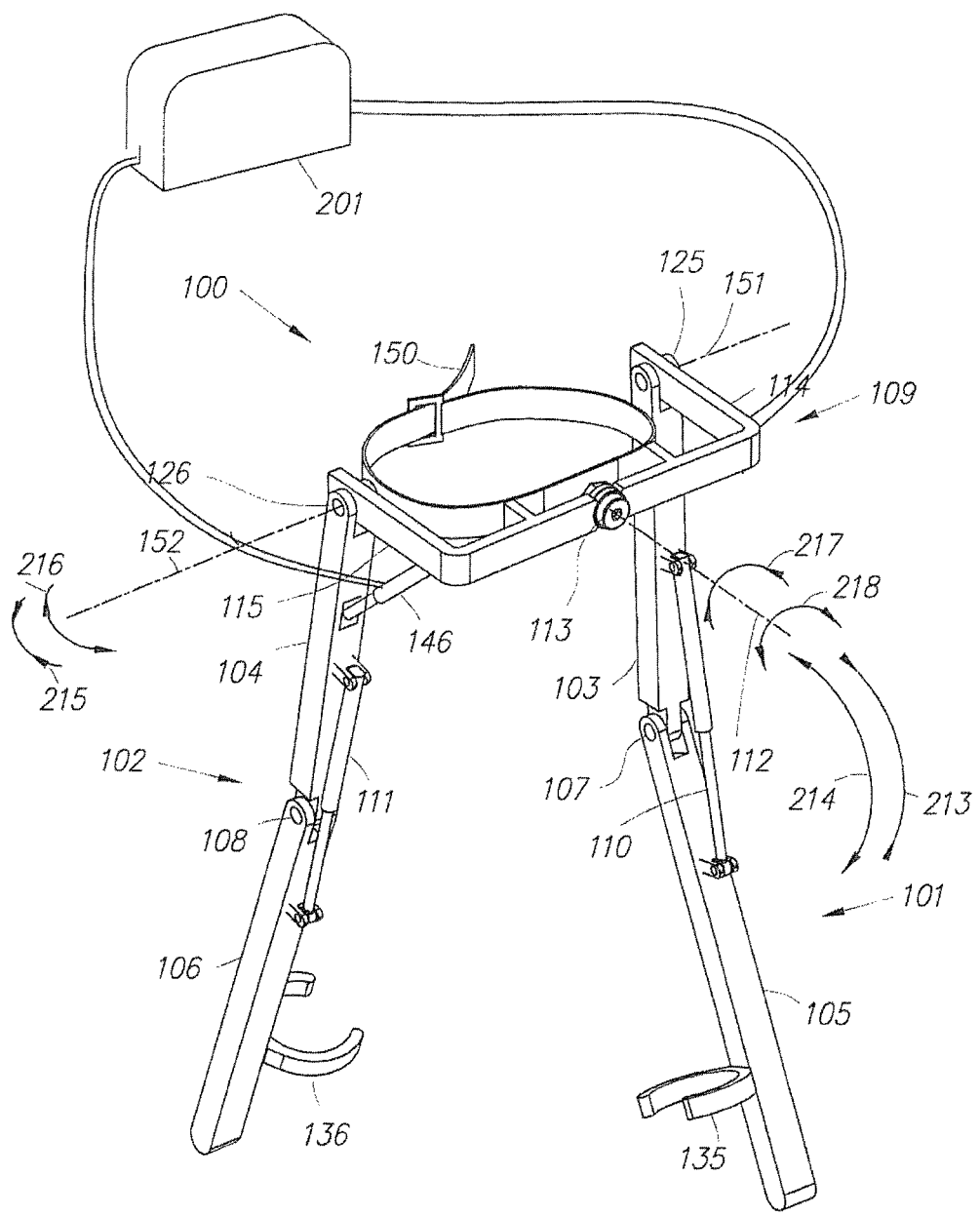
FIG. 2 is a rear perspective drawing of the exoskeleton of FIG. 1.

In accordance with an embodiment of the present invention, FIG. 1 is a perspective drawing illustrating a lower extremity exoskeleton 100 wearable by a person 187 that is able to decrease the wearer's energy consumption during walking. Lower extremity exoskeleton 100, in addition to other components, includes two leg supports, 101 and 102, which are configured to be coupled to person's lower limbs 143 and 144, and is configured to rest on a support surface (e.g., the ground) during their stance phase. The term stance phase should be understood to mean the position a leg support 101 or 102 is in when a force is being applied to a user's foot and leg associated with the leg support 101 or 102. The leg supports, in addition to other components, includes thigh links 103 and 104 and shank links 105 and 106. Two knee joints, 107 and 108, are configured to allow flexion and extension between the shank link and the thigh link of the leg supports (shown by knee flexion arrow 213 and knee extension arrow 214, respectively) during the corresponding leg support swing phase. The term swing phase should be understood to mean the position a leg support 101 or 102 is in when a force is not be applied to a user's foot and leg associated with the leg support 101 or 102. However, two knee joints, 107 and 108, in some embodiments are configured to resist flexion between the shank link and the thigh link of the leg supports during the corresponding leg support stance phase. Lower extremity exoskeleton 100, among other components, further comprises an exoskeleton trunk 109. Exoskeleton trunk 109, among other components, comprises an upper body interface device 150. Exoskeleton trunk 109 is configurable to be coupled to the person's upper body 149 through upper body interface device 150. Person's upper body 149 means any location generally above the thighs, including the buttock. Examples of upper body interface device 150 comprise an element or combination of elements including, without limitation, vests, belts, straps, shoulder straps, chest straps, body cast, harness, and waist belts. Exoskeleton trunk 109 is rotatably connectable to leg supports 101 and 102 at hip flexion-extension joints 125 and 126, allowing for the hip flexion and extension rotations (shown by hip extension arrow 215 and hip flexion arrow 216, respectively) of leg supports 101 and 102 about hip flexion-extension axes 151 and 152, respectively. Leg supports 101 and 102 are configurable to be coupled to person's lower limbs 143 and 144 through lower limb interface straps 135 and 136. Person's lower limbs 143 and 144 should be understood to mean any location generally below the thighs. In some embodiments, as shown in FIG. 1, lower limb interface straps 135 and 136 are coupled to thigh links 103 and 104. In some embodiments, as shown in FIG. 2, lower limb interface straps 135 and 136 are coupled to shank links 105 and 106. In some embodiments, lower limb interface straps are coupled to both shank links and thigh links. Each lower limb interface strap 135 and 136 comprises an element or combination of elements including, without limitation, straps, bars, c-shaped brackets, body cast, and elastomers. In operation, person 187 is coupled to (or wears) lower extremity exoskeleton 100 through upper body interface device 150 (a simple belt in the case of FIG. 1) and by coupling to two leg supports 101 and 102 through lower limb interface straps 135 and 136.

Lower extremity exoskeleton 100, among other things, further comprises two hip actuators 145 and 146 which are configured to create torques between exoskeleton trunk 109 and leg supports 101 and 102. Right hip actuator 145 is shown in FIG. 1 and left hip actuator 146 is shown in FIG. 2. Lower extremity exoskeleton 100, among other components, further comprises at least one power unit 201 capable of providing power and is coupled to hip actuators 145 and 146. In some embodiments, only one power unit 201 provides power to hip actuators 145 and 146. In some embodiments, each hip actuator receives power from separate power units. Hip actuators 145 and 146 comprise any device or combination of devices capable of providing torque. Examples of hip actuators 145 and 146 include, without limitation, electric motors, including, without limitation, AC (alternating current) motors, brush-type DC (direct current) motors, brushless DC motors, electronically commutated motors (ECMs), stepping motors, hydraulic actuators, and pneumatic actuators and combinations thereof. In some embodiments, hip actuators 145 and 146 are powered by compressed gas. In some embodiments, exoskeleton trunk 109 is configured to hold a rear load behind person 187.

Figure 3:
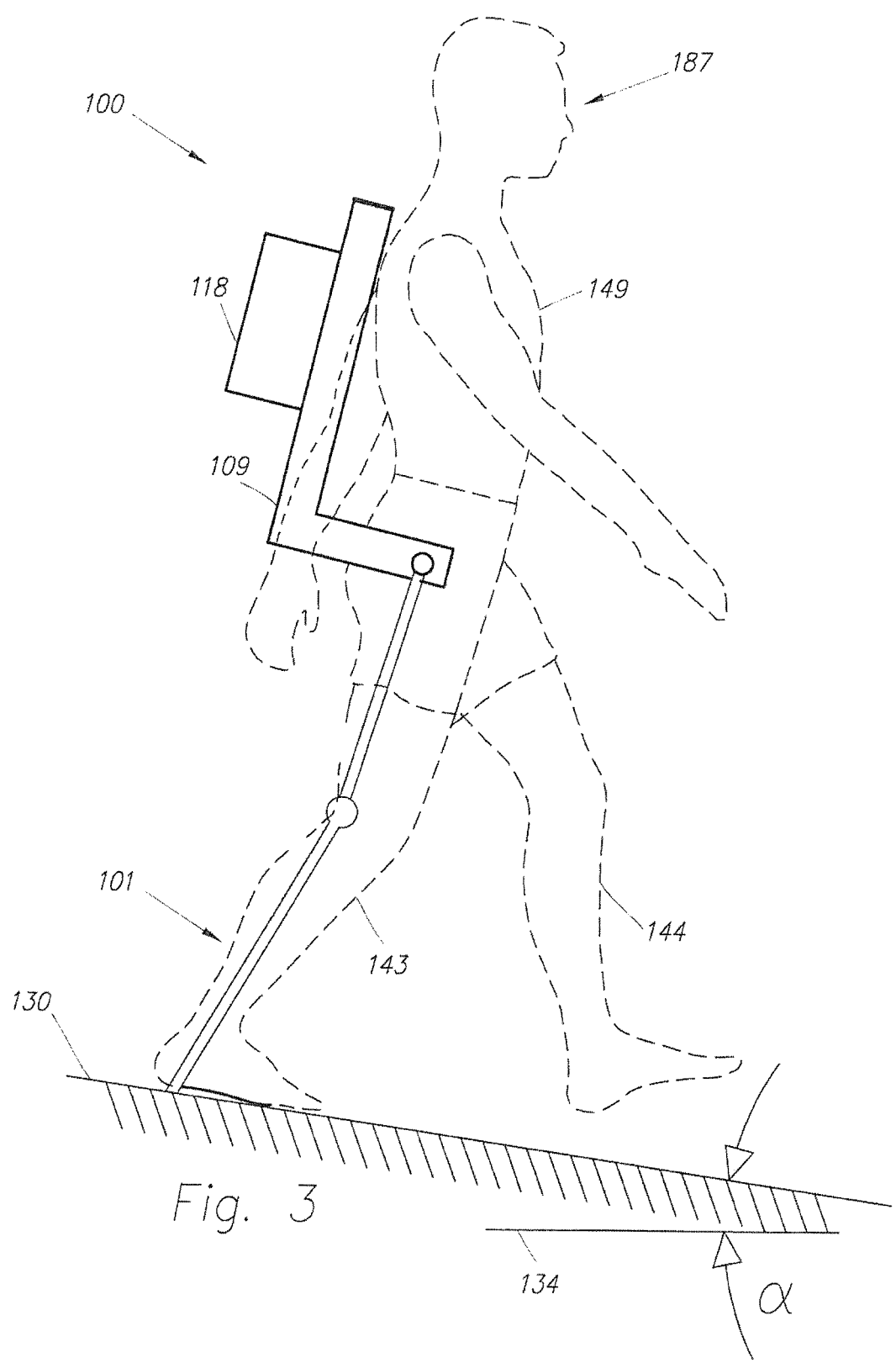
FIG. 3 depicts an alternative exoskeleton of the present invention in a stance phase.
Figure 4:
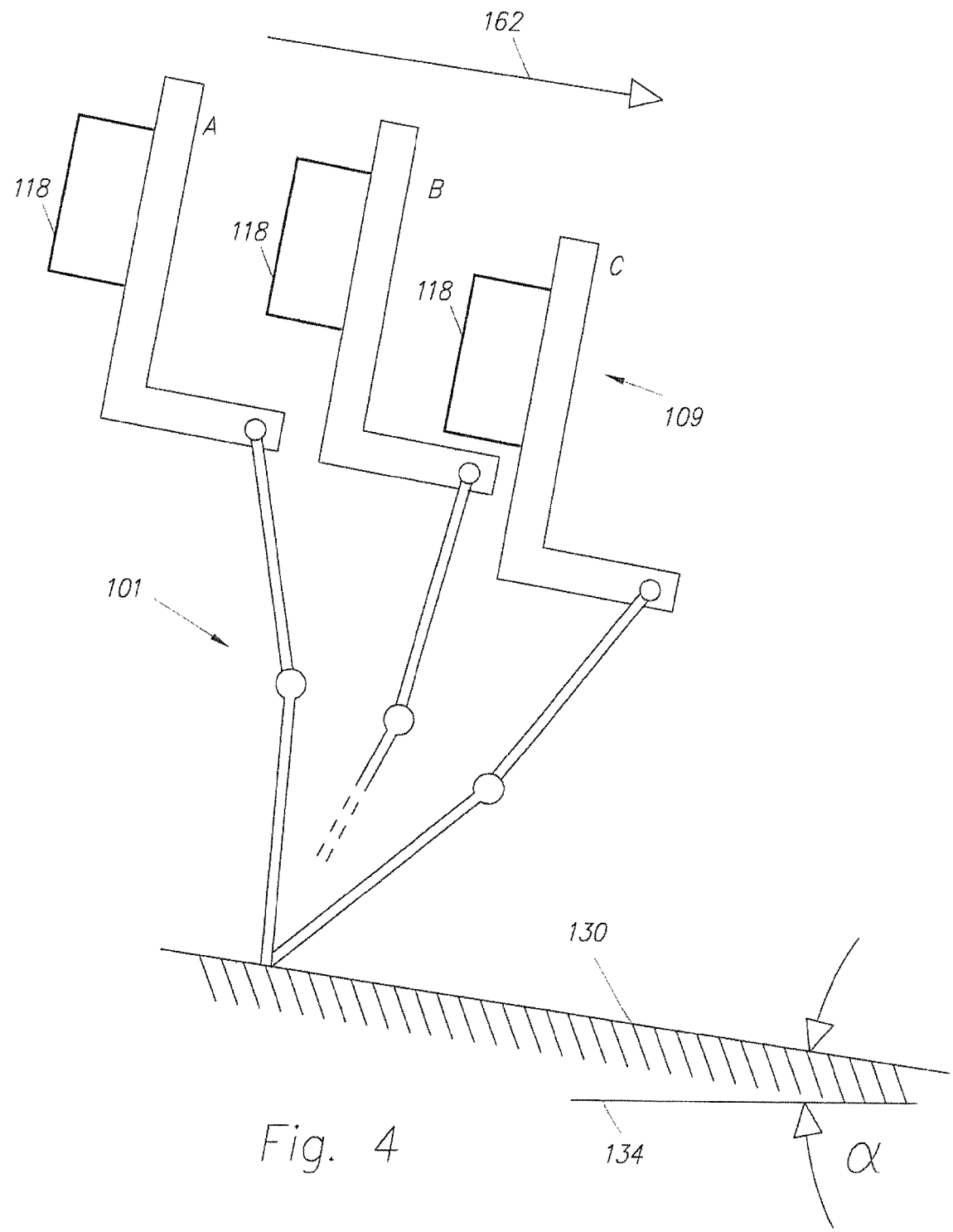
FIG. 4 depicts the exoskeleton of FIG. 3 moving in a forward velocity direction during the stance phase.

FIG. 3 shows a configuration of lower extremity exoskeleton 100 where right leg support 101 and person's right lower limb 143 are in the stance phase, and left leg support 102 and person's left lower limb 144 are in the swing phase (left leg support 102 is not shown in FIG. 3). Please note that exoskeleton trunk 109, in this embodiment, has been designed to extend along a person's back to hold a rear load 118. Further note that the following analysis clearly applies to the reverse configuration where right leg support 101 is in swing phase and left leg support 102 is in stance phase. FIG. 4 shows three configurations of lower extremity exoskeleton 100 during a stance phase of right leg support 101 when a wearer is moving in a forward velocity direction 162. These configurations are shown by letters A (beginning of the single stance phase), B (somewhere in the middle of the single stance phase), and C (end of the single stance phase) of right leg support 101. Based on our observations, we have concluded that a person's upper body 149 and exoskeleton trunk 109 move with little rotation, which results in a relatively constant angle of the persons' upper body 149 and exoskeleton trunk 109 with respect to ground 130.

In operation, when right leg support 101 is in the stance phase and left leg support 102 is in the swing phase, power unit 201 is configured to cause the corresponding right hip actuator 145 of right leg support 101 to create a torque profile. Because of this torque profile, lower extremity exoskeleton 100 and person 187 travel from configuration A to configuration C (as shown in FIG. 4), where right leg support 101 and person's right lower limb 143 are in the stance phase. The person's forward velocity direction 162 is generally parallel with ground 130. During the stance phase of right leg support 101, mechanical work $W_{ACTUATOR}$ is produced by right hip actuator 145 during the time that lower extremity exoskeleton 100 and person 187 travel from configuration A to configuration C. The total mechanical energy (kinetic energy plus potential energy) of right leg support 101 and exoskeleton trunk 109, including any load on exoskeleton trunk 109 (i.e., lower extremity exoskeleton 100 without the swinging left leg support 102), at configuration A is denoted by $E_A$. The total mechanical energy (kinetic energy plus potential energy) of right leg support 101 and exoskeleton trunk 109, including any load on exoskeleton trunk 109, (i.e., lower extremity exoskeleton 100 without the swinging left leg support 102) at configuration C is denoted by $E_C$. The energy wasted to friction and other losses during the stance phase of right leg support 101 are denoted by $E_{LOSS}$. If $W_{ACTUATOR}$ (mechanical work produced by right hip actuator 145) during the time that exoskeleton 100 travels from A to C is larger than $(E_C-E_A+E_{LOSS})$, then energy is transferred to person 187 from lower extremity exoskeleton 100 and is equal to $[W_{ACTUATOR}-(E_C-E_A+E_{LOSS})]$. If $W_{ACTUATOR}$ (i.e., mechanical work produced by right hip actuator 145) is smaller than the $(E_C-E_A+E_{LOSS})$, then energy is transferred from person 187 to lower extremity exoskeleton 100 and is equal to $[(E_C-E_A+E_{LOSS})-W_{ACTUATOR}]$.

In summary:

If $W_{ACTUATOR}>(E_C-E_A+E_{LOSS})$, energy transferred to person 187=$W_{ACTUATOR}-(E_C-E_A+E_{LOSS})$ If $W_{ACTUATOR}<(E_C-E_A+E_{LOSS})$, energy transferred from person 187=$(E_C-E_A+E_{LOSS})-W_{ACTUATOR}$ The required energy to move exoskeleton trunk 109 and right leg support 101 through the same trajectory from A to C when exoskeleton 100 is not worn by person 187 is $(E_C-E_A+E_{LOSS})$. This means that, to transfer energy to person 187 during the stance phase of right leg support 101, the energy supplied by power unit 201 to right hip actuator 145 of right leg support 101 must be larger than the energy required to move exoskeleton trunk 109 and right leg support 101 through the same trajectory from A to C when person 187 is not present. An incremental increase in mechanical energy transferred to person 187 during the stance phase will result in an incremental decrease in wearer's energy required for locomotion during the stance phase. Since the wearer's oxygen consumption is proportional with the energy expenditure, a decrease in the wearer's energy required for locomotion leads to less oxygen consumption by the wearer. One way to ensure mechanical energy is transferred to person 187 during the stance phase is to ensure that the torque profile of right hip actuator 145 of right leg support 101 is generally larger than the torque required to move exoskeleton trunk 109 and right leg support 101 through the same trajectory from A to C when person 187 is not present. This is described below with the help of FIG. 4 and FIG. 5.

Figure 5:
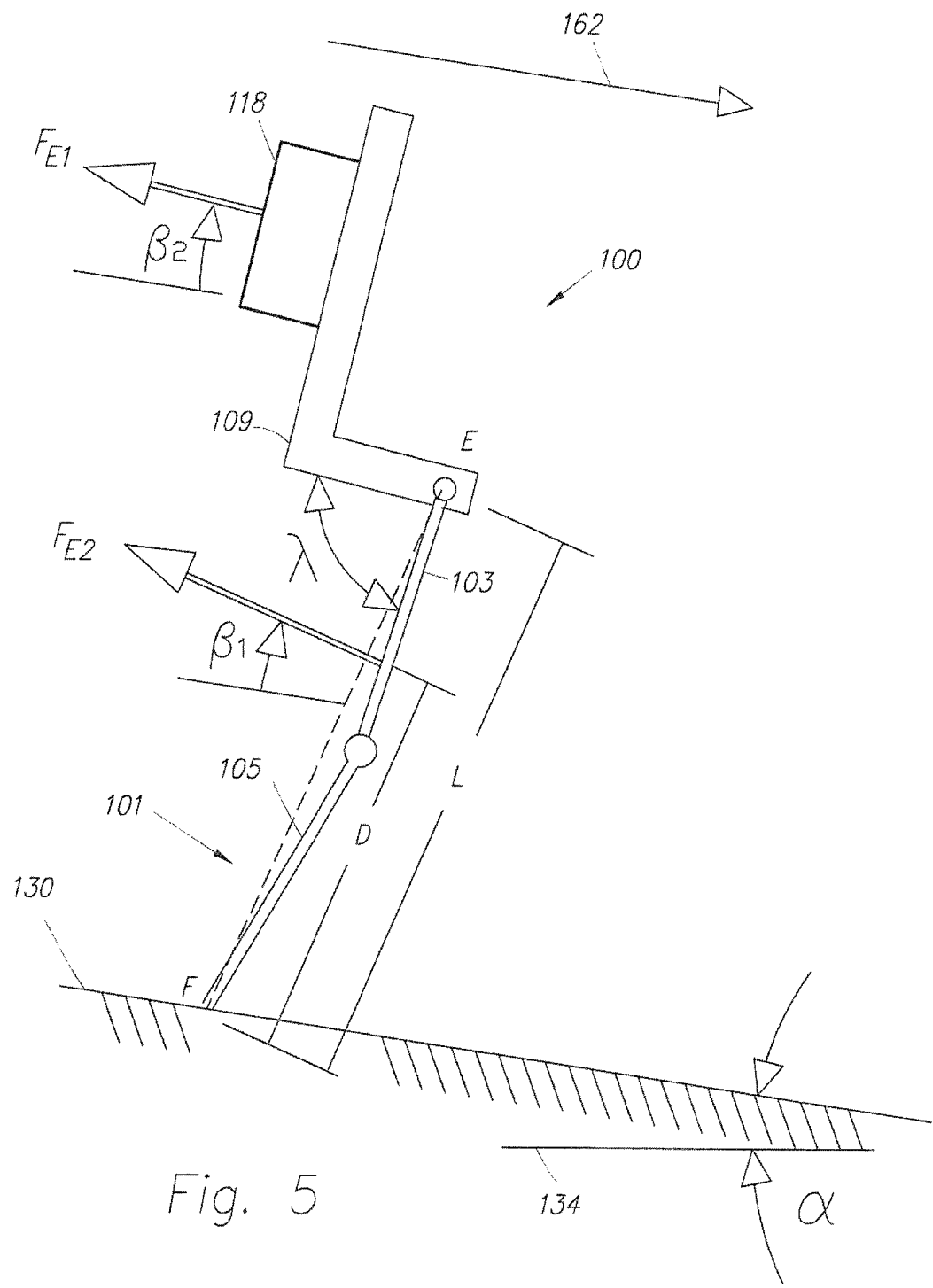
FIG. 5 depicts forces and dimensions associated with the exoskeleton of FIG. 3 in the stance phase.

FIG. 5 shows a configuration of lower extremity exoskeleton 100 when right leg support 101 is in the stance phase (the same configuration as FIG. 3 without the person drawn). Ground 130 has a slope of α with the horizontal ground 134. Person's upper body 149 is coupled to exoskeleton trunk 109 through upper body interface device 150. Based on our observations, we have noticed that person's upper body 149 and exoskeleton trunk 109 move with little rotation (compared to variation of hip angle λ). This means that the angle of the persons' upper body 149 and exoskeleton trunk 109 with respect to ground 130 remains relatively constant during the stance phase of right leg support 101. $\beta_2$ represents the angle between ground 130 and a line perpendicular to exoskeleton trunk 109, as shown in FIG. 5. Based on the observations described above, $\beta_2$ is relatively constant in comparison to angle $\lambda$. During the stance phase, right thigh link 103 and right shank link 105 move very little or not at all relative to each other. This means right leg support 101 during the stance phase can be approximated like a rigid link swinging from position A to position C, as shown in FIG. 4.

The Kinetic energy and the Potential energy of the system shown in FIG. 4 are expressed by equations (1) and (2).

$$\text{Kinetic Energy} = \frac{(M_{TRUNK}L^2 + I)}{2} \dot{\beta}_1^2 \qquad (1)$$

$$\text{Potential Energy} = (LM_{TRUNK} + RM_L)g\text{Cos}(\beta_1 + \alpha) + K \qquad (2)$$

where:

$M_{TRUNK}$: mass of exoskeleton trunk 109 and any attached load (e.g., rear load 118)

$M_L$: mass of right leg support 101

I: moment of inertia of right leg support 101 about point F

L: length of right leg support 101 during stance as shown in FIG. 5

R: distance between the center of mass of right leg support 101 and point F (not shown in any figure)

$\beta_1$: the angle between ground 130 and a line normal to a line between points E and F (angle between force $F_{E1}$ and ground 130)

$\beta_2$ the angle between ground 130 and a line normal to exoskeleton trunk 109 (angle between force $F_{E2}$ and ground 130)

$\alpha$: ground slope (angle between ground 130 and horizontal ground 134)

D distance between force $F_{E2}$ and point F

K A constant quantity

Writing a dynamic equation for the exoskeleton shown in FIG. 5, using equations (1) and (2) and the Lagrangean equation, reveals that the torque provided by right hip actuator 145 between exoskeleton trunk 109 and right leg support 101, $T_E$, is equal to $$T_E = (M_{TRUNK}L^2+I)\ddot{\beta}_1(LM_{TRUNK}+RM_L)g \text{ Sin}(\beta_1+\alpha)+ T_F+F_{E1}L \text{ Cos}(\beta_2-\beta_1)+F_{E2}D \qquad (3)$$

where:

$F_{E1}$ force on exoskeleton trunk 109 from Person's upper body 149, assumed to be normal to the exoskeleton trunk 109 (positive value is shown in FIG. 5)

$F_{E2}$ force on right leg support 101 from person right lower limb 143, assumed to be normal to a line between points E and F (positive value is shown in FIG. 5)

$T_E$: torque generated by right hip actuator 145 (positive value decreases angle $\lambda$)

$T_F$: friction torque opposing the motion of right leg support 101 relative to exoskeleton trunk 109

Since $\beta_2$ is relatively constant in comparison to angle $\lambda$ (exoskeleton trunk 109 does not rotate much) any interaction torque between person's upper body 149 and exoskeleton trunk 109 will not appear in equation (3). Only the interaction force (e.g., $F_{E1}$ from person' upper body 149 onto exoskeleton trunk 109) affects the motion of exoskeleton trunk 109.

Rearranging the terms in equation (3) results in equation (4):

$$F_{E1}L \text{ Cos}(\beta_2-\beta_1)+F_{E2}D = T_E-(M_{TRUNK}L^2+I)\ddot{\beta}_1 (LM_{TRUNK}+RM_L)g \text{ Sin}(\beta_1+\alpha)-T_F \qquad (4)$$

Assume for a moment that $F_{E2}=0$. This assumption is only for the sake of understanding the conditions under which the wearer's energy expenditure is reduced. Later, this assumption will be removed. If $F_{E2}=0$, equation (4) reduces to equation (5).

$$F_{E1} = \frac{T_E - (M_{TRUNK}L^2 + I)\ddot{\beta}_1 + (LM_{TRUNK} + RM_L)g\text{Sin}(\beta_1 + \alpha) - T_F}{L\text{Cos}(\beta_2 - \beta_1)} \qquad (5)$$

We will consider three cases described below.

Case 1

As can be examined from equation (5), if the hip actuator torque $T_E$ is such that:

$$T_E > (M_{TRUNK}L^2+I)\ddot{\beta}_1-(LM_{TRUNK}+RM_L)g \text{ Sin}(\beta_1+\alpha)+ T_F \qquad (6)$$

Then $F_{E1}>0$. This means if the hip actuator torque is chosen such that it is larger than the addition of the inertial torque $(M_{TRUNK}L^2+I)\ddot{\beta}_1$, gravitational torque, $-(LM_{TRUNK}+RM_L)g$ Sin$(\beta_1+\alpha)$, and the frictional torque $T_F$, then the force from person 187 on exoskeleton trunk 109 $F_{E1}$ is positive. This means the force from person 187 on exoskeleton trunk 109 is in the direction shown in FIG. 5 and the force on person 187 is generally along the direction of person's forward velocity direction 162. When the force on person 187 is in the direction along the person's forward velocity direction 162 (as shown in FIG. 5), mechanical power is transferred from lower extremity exoskeleton 100 to person 187. Since the time integral of this mechanical power over the entire stance time is positive, mechanical energy is transferred to person 187. Mechanical energy transferred to person 187 during the stance phase will result in an incremental decrease in the wearer's energy required for locomotion during the stance phase. An incremental decrease in the wearer's energy required for locomotion leads to less oxygen consumption and a lower heart rate. The right hand side of inequality (6) represents the torque required to move exoskeleton trunk 109 and right leg support 101 in the stance phase through the same trajectory when exoskeleton 100 is not worn by person 187.

The situation of Case 1 (described above) shows that in order to reduce the wearer's energy expenditure while walking (and consequently oxygen consumption and heart rate), the torque profile from the hip actuator, when exoskeleton 100 is worn by person 187, should create a force from exoskeleton trunk 109 onto person's upper body along the person's forward velocity direction 162. This means that to reduce the wearer's energy expenditure while walking, person 187 should be pushed forwardly by exoskeleton trunk 109. The above Case 1 also indicates that to reduce the wearer's energy expenditure while walking (and consequently oxygen consumption and heart rate), the torque profile from the hip actuator, when exoskeleton 100 is worn by person 187, should be larger than the torque required to move exoskeleton trunk 109 and leg support 101 during stance phase through the same trajectory when not worn by person 187.

Case 2

As can be examined from equation (5), if the hip actuator torque, $T_E$, is such that:

$$T_E < (M_{TRUNK}L^2+I)\ddot{\beta}_1 - (LM_{TRUNK}+RM_L)g \sin(\beta_1+\alpha) + T_F \quad (7)$$

then $F_{E1}<0$. This means that if the hip actuator torque is chosen so that it is smaller than the addition of the inertial torque $(M_{TRUNK}L^2+I)\ddot{\beta}_1$, gravitational torque, $-(LM_{TRUNK}+RM_L)g \sin(\beta_1+\alpha)$ and the frictional torque $T_F$, then the force on the exoskeleton, $F_{E1}$, is negative. This means the force from person 187 on exoskeleton trunk 109 is in the opposite direction shown in FIG. 5 and the force on person 187 is along the opposite direction of person's forward velocity direction 162. When the force on person 187 is in the opposite direction of the person's forward velocity direction 162, power is transferred from person 187 to lower extremity exoskeleton 100. Since the time integral of this mechanical power over the entire stance time is negative, mechanical energy is transferred from person 187 to lower extremity exoskeleton 100. Mechanical energy transferred from person 187 during the stance phase will result in an incremental increase in wearer's energy required for locomotion during the stance phase. An incremental increase in wearer's energy required for locomotion leads to more oxygen consumption and higher heart rate for the wearer. The right hand side of inequality (7) represents the torque required to move exoskeleton trunk 109 and right leg support 101 during the stance phase through the same trajectory when not worn by person 187.

Case 3

If $T_E = (M_{TRUNK}L^2+I)\ddot{\beta}_1 - (L_LM_{TRUNK}+DM_L)g \sin(\beta_1+\alpha) + T_F \quad (8)$ Then $F_{E1}=0$. This means if the hip actuator torque is chosen to be exactly equal to the summation of the inertial torque $(M_{TRUNK}L^2+I)\ddot{\beta}_1$, gravitational torque, $-(L_LM_{TRUNK}+RM_L)g \sin(\beta_1+\alpha)$, and the frictional torque $T_F$, then the interaction force between person 187 and the exoskeleton, $F_E$ is zero. This means the person does not feel the exoskeleton and therefore the power person 187 is spending is the same as what he/she would be spending when walking without any exoskeleton. This means no energy is transferred between the exoskeleton and its wearer. In this case, the wearer's energy expenditure neither increases nor decreases.

If $F_{E2} \neq 0$, the left side of equation (9) represents the torque from person 187 onto lower extremity exoskeleton 100 about point F:

$$F_{E1}L \cos(\beta_2-\beta_1)+F_{E2}D = T_E - (M_{TRUNK}L^2+I)\ddot{\beta}_1 + (LM_{TRUNK}+RM_L)g \sin(\beta_1+\alpha) - T_F \quad (9)$$

The three cases described previously for equation (5) can be repeated for equation (9) as described below.

Case 1

As can be examined from equation (9) if hip actuator torque $T_E$ is such that:

$$T_E > (M_{TRUNK}L^2+I)\ddot{\beta}_1 - (LM_{TRUNK}+RM_L)g \sin(\beta_1+\alpha) + T_F \quad (10)$$

Then $F_{E1}L \cos(\beta_2-\beta_1)+F_{E2}D>0$. This means if the actuator torque is chosen such that it is larger than the summation of the inertial torque $(M_{TRUNK}L^2+I)\ddot{\beta}_1$, gravitational torque $-(LM_{TRUNK}+RM_L)g \sin(\beta_1+\alpha)$, and the frictional torque $T_F$, then the torque from person 187 onto lower extremity exoskeleton 100 about point F, $F_{E1}L \cos(\beta_2-\beta_1)+F_{E2}D$, is positive. This means that the torque from person 187 on lower extremity exoskeleton 100 is in the counterclockwise direction and the torque on person 187 is in the clockwise direction and along the person's forward velocity direction 162. When the torque on person 187 is along the person's forward velocity direction 162 (as shown in FIG. 5), power is transferred from lower extremity exoskeleton 100 to person 187. Since the time integral of this power over the entire stance time is positive, mechanical energy is transferred to person 187 from lower extremity exoskeleton 100.

The situation of Case 1 (described above) teaches that to reduce the wearer's energy expenditure while walking (and consequently oxygen consumption and heart rate), the torque profile from hip actuator when exoskeleton 100 is worn by person 187 should create a clockwise torque from exoskeleton 100 onto person 187 about point F. This means that to reduce the wearer's walking energy expenditure, person 187 should be pushed forwardly by exoskeleton 100. The above Case 1 also teaches that to reduce the wearer's energy expenditure while walking (and consequently oxygen consumption and heart rate), the torque profile from hip actuator when exoskeleton 100 is worn by person 187 should be larger than the torque required to move exoskeleton trunk 109 and leg support in stance phase through the same trajectory when not worn by person 187.

Case 2

As can be examined from equation (9) if the hip actuator torque, $T_E$ is such that:

$$T_E < (M_{TRUNK}L^2+I)\ddot{\beta}_1 - (LM_{TRUNK}+RM_L)g \sin(\beta_1+\alpha) + T_F \quad (11)$$

Then $F_{E1}L \cos(\beta_2-\beta_1)+F_{E2}D<0$. This means that if the hip actuator torque is chosen such that it is smaller than the summation of the inertial torque $(M_{TRUNK}L^2+I)\ddot{\beta}_1$, gravitational torque $-(LM_{TRUNK}+RM_L)g \sin(\beta_1+\alpha)$ and the frictional torque $T_F$, then the torque from person 187 onto lower extremity exoskeleton 100 about point F, $F_{E1}L \cos(\beta_2-\beta_1)+F_{E2}D$, is negative. This means that the torque from person 187 on lower extremity exoskeleton 100 about point F is in the clockwise direction and the torque on person 187 is opposite to the person's forward velocity direction 162 (counterclockwise direction). When the torque on person 187 is opposite to the person's forward velocity direction 162 (as shown in FIG. 5), power is transferred from person 187 to lower extremity exoskeleton 100. If the time integral of this power over the entire stance time is negative, mechanical energy is transferred to lower extremity exoskeleton 100 from person 187.

Case 3

As can be examined from equation (9), if the hip actuator torque $T_E$ is such that:

$$T_E = (M_{TRUNK}L^2+I)\ddot{\beta}_1 - (LM_{TRUNK}+RM_L)g \sin(\beta_1+\alpha) + T_F \quad (12)$$

Then $F_{E1}L \cos(\beta_2-\beta_1)+F_{E2}D=0$. This means the torque from person 187 onto lower extremity exoskeleton 100 about point F is zero. If the time integral of this power over the entire stance time is zero, no mechanical energy is transferred between lower extremity exoskeleton 100 and person 187. In this case, the wearer's energy expenditure neither increases nor decreases.

Remark 1

Since exoskeleton trunk 109 rotates very little (i.e., $\beta_2$ is relatively constant in comparison to angle $\lambda$) and the summation of torques on exoskeleton trunk 109 is zero, equation (13) states that the torque on exoskeleton trunk 109 from person's upper body cancels the algebraic summation of the reaction torques from hip actuators 145 and 146.

$$T_P = T_E - T_S - T_G \quad (13)$$

where:

$T_P$: Torque on exoskeleton trunk 109 from person's upper body 149

$T_E$: Torque on exoskeleton trunk 109 from the leg support in stance phase $T_S$: Torque on exoskeleton trunk 109 from the leg support in swing phase ($T_S$ is positive when it tries to turn the exoskeleton trunk in the CW direction around point E $T_G$: Torque due to the weight of the exoskeleton trunk and any attached load around point E ($T_G$ is positive when it tries to turn the exoskeleton trunk in the CW direction around point E)

If the leg support that is in the swing phase swings by force of the person, $T_S$ is zero. If the leg support that is in the swing phase swings by power of the hip actuator, $T_S$ is not zero. To reduce $T_P$ (the torque on exoskeleton trunk 109 from person's upper body 149), equation (13) suggests that the leg support in the swing phase be powered (i.e., $T_S$ should be nonzero). This means the hip actuator of the swinging leg should impose a torque in the opposite direction of the hip torque in the stance phase, to reduce the torque the person's upper body 149 supports.

Remark 2

In general, any lower extremity exoskeleton, regardless of the number of actuators and their locations on the exoskeleton system, decreases its wearer's energy expenditure as long as the force from the exoskeleton trunk onto the wearer's upper body is along the person's forward velocity. For example one can install at least one actuator on each exoskeleton ankle and provide a force from the exoskeleton trunk onto the wearer's upper body along the person's forward velocity. When the force on the person is in the direction along the person's forward velocity, regardless of the exoskeleton architecture, mechanical power is transferred from the exoskeleton to the person. Mechanical energy transferred to the person during the stance phase, will result in an incremental decrease in wearer's energy required for locomotion. An incremental decrease in wearer's energy required for locomotion leads to less oxygen consumption and lower heart rate.

Remark 3

The above analysis shows how a lower extremity exoskeleton can reduce its wearer's energy expenditure during the stance phase. An exoskeleton system that has two arms, in addition to two lower extremities, can also reduce its wearer's energy expenditure as long as the lower extremities of the exoskeleton function according to the teaching described above.

Figure 6:
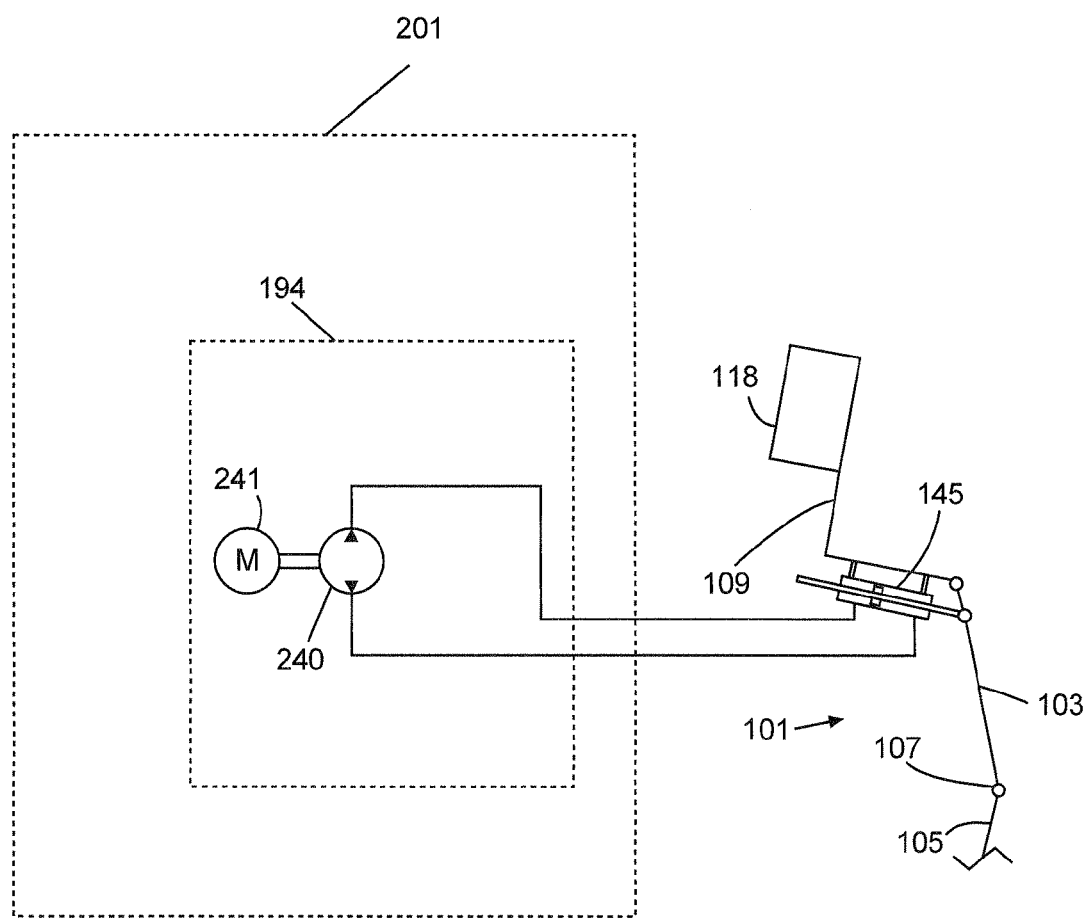
FIG. 6 is a schematic drawing of a power unit of the present invention.

In some embodiments, hip actuators 145 and 146 each comprise a hydraulic hip actuator. In these embodiments, at least one power unit 201 provides hydraulic power to hip actuators 145 and 146. In some embodiments, only one power unit 201 provides hydraulic power to hydraulic hip actuators 145 and 146. In some embodiments, each hydraulic hip actuator receives hydraulic power from separate power units. In some embodiments, power unit 201, as shown in FIG. 6, among other components, comprises at least one hydraulic circuit 194 connectable to at least one of hydraulic hip actuators 145 and 146, and modulates the hydraulic fluid flow to and from hydraulic hip actuators 145 and 146. In some embodiments, hydraulic hip actuators 145 and 146 are hydraulic piston-cylinders. In some embodiments, hydraulic hip actuators 145 and 146 are rotary hydraulic vane type hydraulic actuators. In some embodiments, as shown in FIG. 6, hydraulic circuit 194, among other components, comprises a hydraulic pump 240 coupled to an electric motor 241.

By controlling electric motor 241, a torque profile can be implemented on hip actuators 145, 146 to satisfy the inequalities (6) or (10). Since the torque is a function of the hydraulic pressure and the hip actuator geometry, the hip actuator torque can be controlled by creating a closed loop control on the electric motor 241 by measuring the hydraulic pressure as the feedback variable. In some embodiments, the hip actuator torque can be controlled to satisfy inequalities (6) or (10) by creating a closed loop control on the electric motor 241 by measuring the hip actuator torque or force as the feedback variable.

Figure 7:
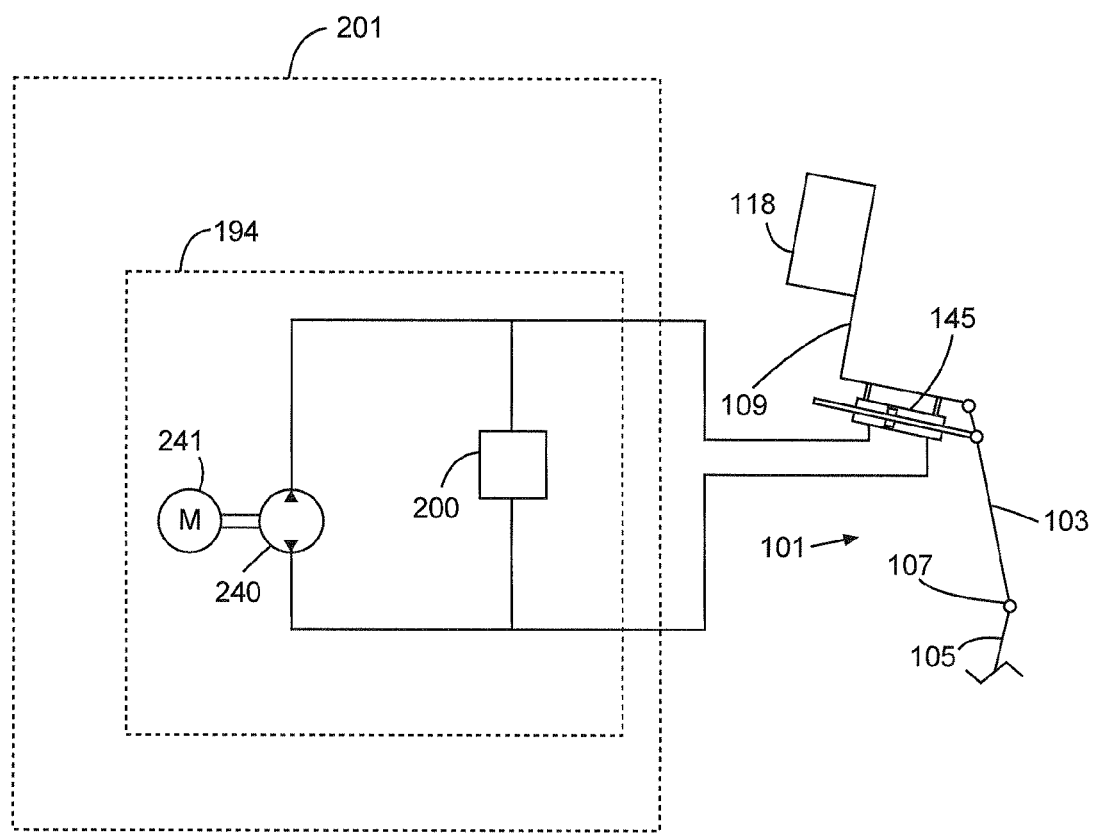
FIG. 7 is a schematic drawing of an alternative power unit of the present invention including a flow restrictive valve.

In some embodiments, as shown in FIG. 7, hydraulic circuit 194, among other components, further comprises an actuated flow restricting valve 200 capable of redirecting hydraulic fluid from hydraulic right hip actuator 145 around hydraulic pump 240. In operation, when hydraulic pump 240 is in use, actuated flow restricting valve 200 is closed. In operation, when it is necessary to reduce the power consumption, electric motor 241 will not be powered. In that case, actuated flow restricting valve 200 may be opened so that unpowered electric motor 241 and pump 240 will not impede the motion of right hip actuator 145.

Figure 8:
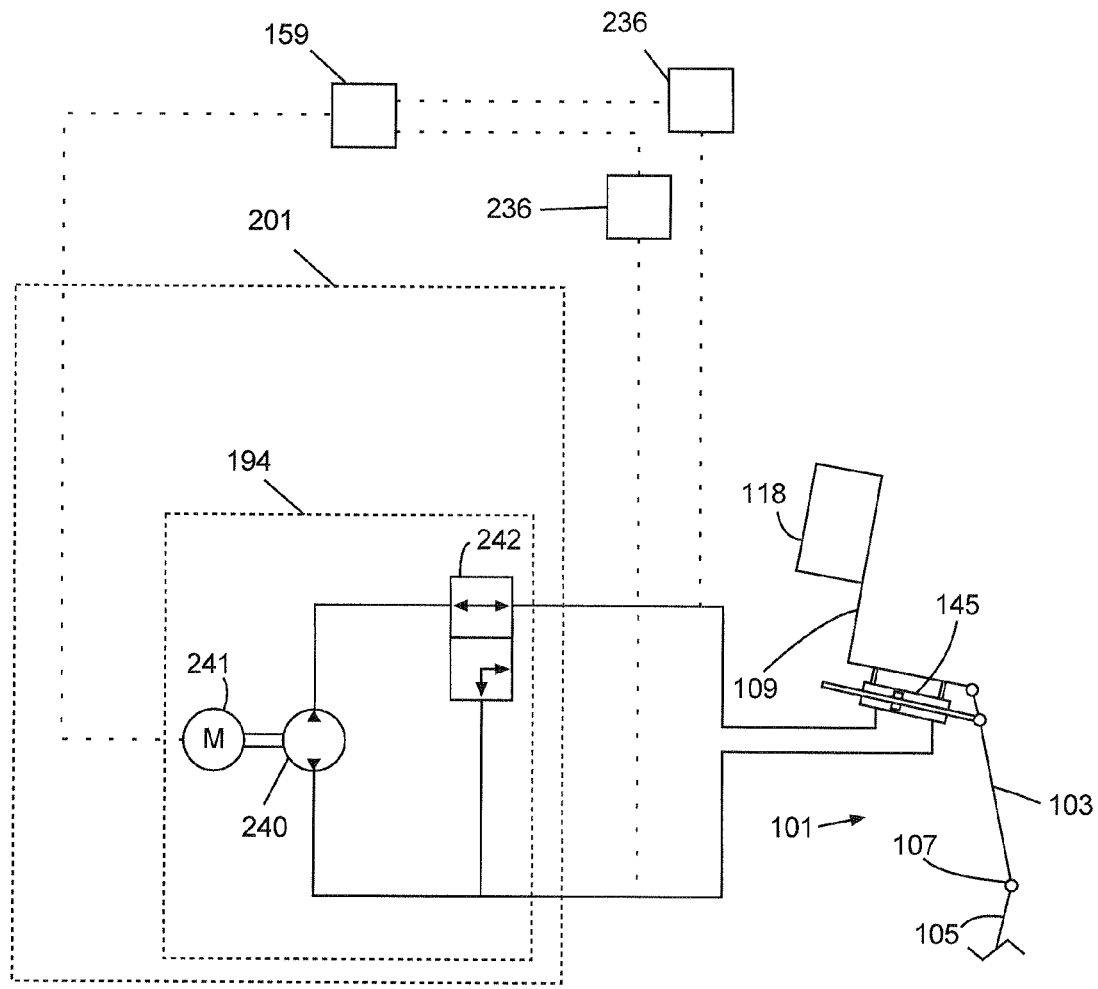
FIG. 8 is a schematic drawing of an alternative power unit of the present invention including a three-way valve.

In some embodiments, as shown in FIG. 8, hydraulic circuit 194, among other components, further comprises a three-way valve 242. In operation, while power unit 201 provides hydraulic power to right hip actuator 145, three-way valve 242 connects hydraulic right hip actuator 145 to hydraulic pump 240. In operation, when it is necessary to reduce the power consumption, electric motor 241 will not be powered. In that case three-way valve 242 may redirect hydraulic fluid from hydraulic right hip actuator 145 around hydraulic pump 240 so that unpowered electric motor 241 and pump 240 will not impede the motion of right hip actuator 145.

FIGS. 6, 7, and 8 show only those components that are needed to accomplish the described task associated with reducing the wearer's energy expenditure. An ordinary skilled in the art can realize that a hydraulic circuit usually has many other components associated with safety and other features not discussed here.

Hydraulic hip actuators 145 and 146 comprise any hydraulic actuators or combination of actuators capable of converting pressurized hydraulic fluid into force or torque. Examples of hydraulic actuators include, without limitation, linear hydraulic piston-cylinders, rotary hydraulic actuators, rack-and-pinion-type rotary actuators and rotary hydraulic vane type actuators where pressurized hydraulic fluid, by pushing against moving surfaces, generate force or torque.

Actuated flow restricting valve 200 comprises any valve or combination of valves capable of performing the indicated functions. Examples of actuated flow restricting valve 200 include, without limitation, flow control valve, pressure control valve, actuated needle valves, solenoid valves and on-off valves. Hydraulic pump 240 comprises any pump or combination of pumps capable of performing the indicated functions. Examples of hydraulic pump 240 include, without limitation gear pump, vane pump, axial piston pump, and radial piston pump.

Electric motor 241 comprises any device or combination of devices capable of driving hydraulic pump 240. Examples of motor 241 include, without limitation, electric motors, including, without limitation, AC (alternating current) motors, brush-type DC (direct current) motors, brushless DC motors, electronically commutated motors (ECMs), stepping motors, and any combination thereof. Although we state that electric motor 241 turns hydraulic pump 240, one skilled in the field can realize that both motor 241 and hydraulic pump 240 may have other types of non-rotational couplings, such as reciprocating linear motion.

In some embodiments of the invention, lower extremity exoskeleton 100 comprises at least one signal processor 159 capable of controlling hip actuators 145 and 146. Signal processor 159 comprises an element or combination of elements selected from a group consisting of analog devices; analog computation modules; digital devices including, without limitation, small-, medium-, and large-scale integrated circuits, application specific integrated circuits, programmable gate arrays, programmable logic arrays; electromechanical relays, solid state switches, MOSFET switches and digital computation modules including, without limitation, microcomputers, microprocessors, microcontrollers, and programmable logic controllers. In operation, to decrease the wearer's energy expenditure, signal processor 159 computes a torque profile that satisfies inequalities (6) or (10). This torque is then produced by hip actuators 145 and 146 during their respective stance phase.

Figure 44:
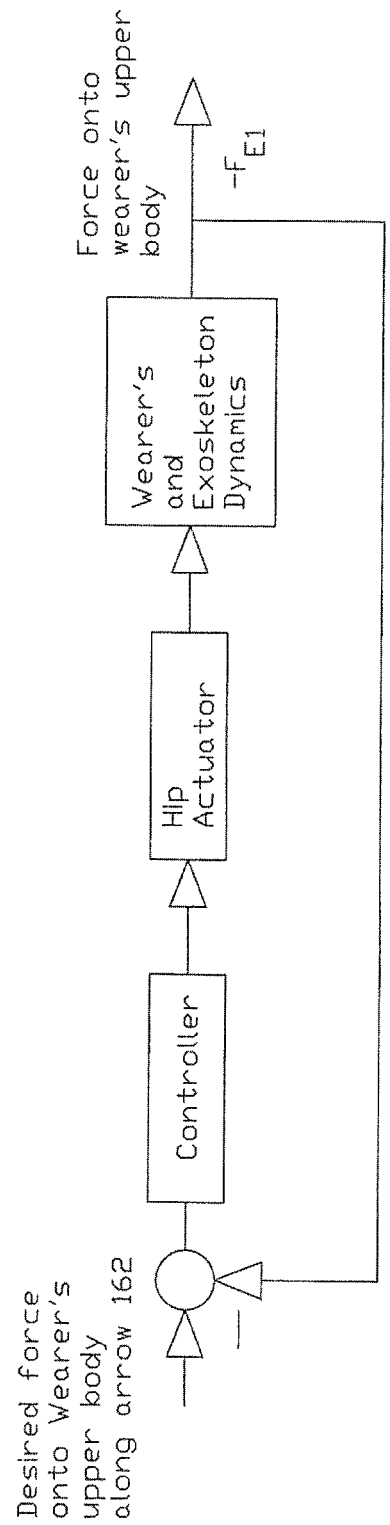
FIG. 44 is a diagram depicting the use of a closed loop controller to control force applied in accordance with the present invention.

In some embodiments where hip actuators 145 and 146 are hydraulic actuators, signal processor 159, by controlling electric motor 241, computes a torque profile as described in inequalities (6) or (10) for hip actuators 145 and 146. Since the torque is a function of the hydraulic pressure and the hip actuator geometry, the hip actuator torque in some embodiments, as shown in FIG. 8, can be controlled by creating a closed loop control on the electric motor 241 by measuring the hydraulic pressure as the feedback variable. Pressure sensor 236 measures the pressure of the hydraulic fluid and signal processor 159 ensures the pressure is regulated to the desired value. In some embodiments, the hip actuator torque can be controlled to satisfy inequalities (6) or (10) by creating a closed loop control on the electric motor 241 by measuring the hip actuator torque or force as the feedback variable. A skilled control engineer will be able to develop a controller as shown in FIG. 44 to satisfy inequalities (6) or (10).

Signal processor 159, in some embodiments, is mounted to exoskeleton trunk 109. In some embodiments, signal processor 159 is located inside power unit 201. Signal processor 159 may be a simple mechanical device consisting of a hydraulic or pneumatic circuit, or it may include electronic elements as well.

FIG. 5 shows that in order to reduce a wearer's energy expenditure, the force on person 187 should be along the person's forward velocity direction 162. This can be done either in a closed loop fashion or in an open loop fashion. In the closed loop fashion, one can develop a control algorithm in signal processor 159 to ensure that a force is always imposed on person 187 along the person's forward velocity direction 162. In some embodiments, this can be done by creating a closed loop force controller on person 187. The closed loop controller measures the force between person's upper body and exoskeleton 100 and creates a torque for the hip actuator in the stance phase to ensure that this force on the person is always pushing the person forward. In some embodiments, the force between upper body interface device 150 and human upper body is measured as a feedback variable and controlled to be along the person's forward velocity direction 162. FIG. 44 shows an embodiment of the control block diagram where the force on the wearer's upper body is measured and compared with a desired force onto the wearer's upper body. To reduce the wearer's energy expenditure, this closed loop controller ensures that the force on the wearer's upper body follows the desired force along the wearer's forward velocity. This means that, to reduce the wearer's energy expenditure, the controller ensures the wearer's upper body is pushed forwardly.

Figure 9:
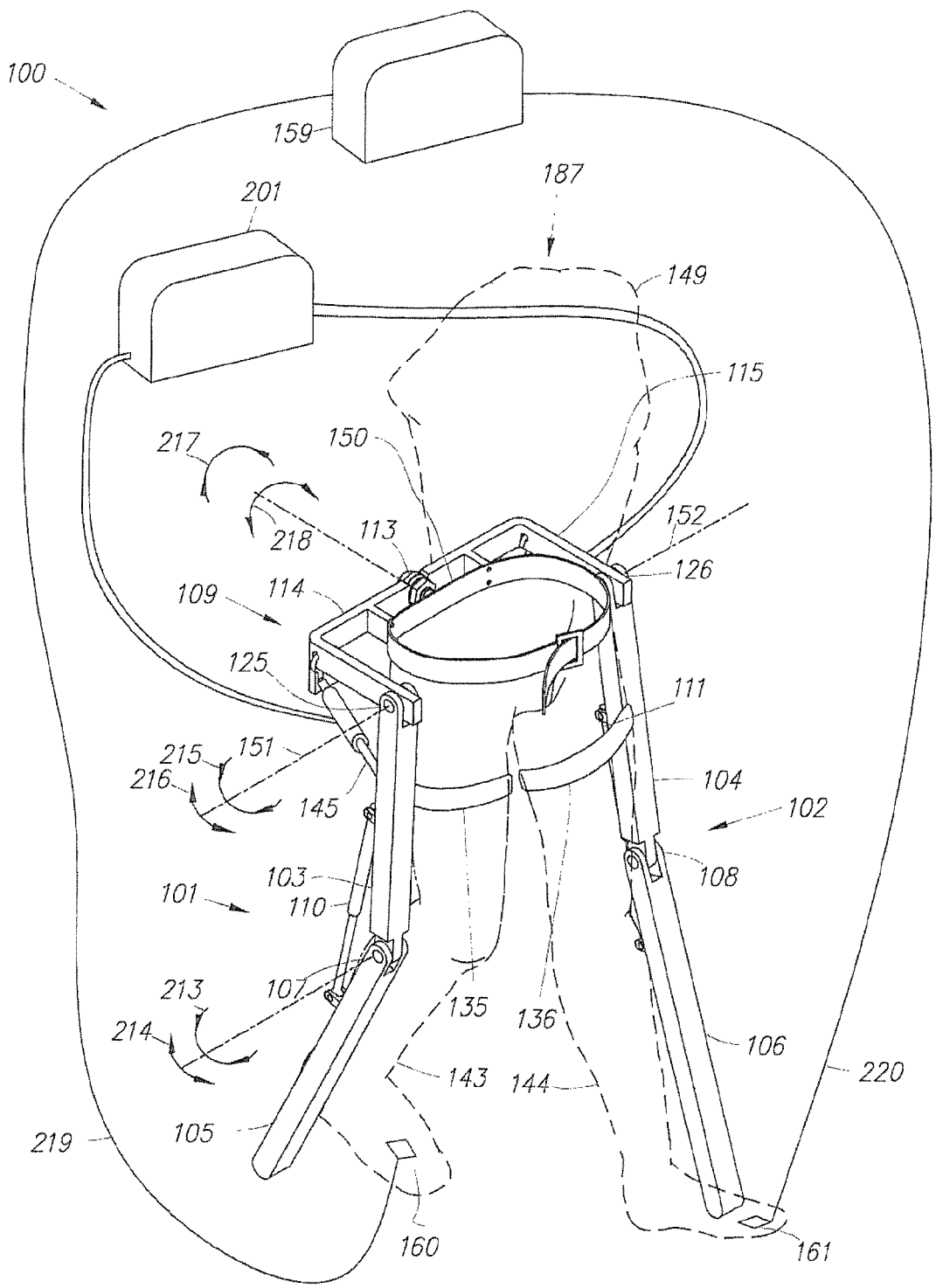
FIG. 9 is a perspective drawing of an alternative exoskeleton of the present invention including stance sensors in communication with a signal processor.

In some embodiments, as shown in FIG. 9, lower extremity exoskeleton 100 comprises at least one stance sensor per leg support, which produces a stance signal indicating whether or not the leg support is in the stance phase. In the embodiment of FIG. 9, leg support 101 includes stance sensor 160, which produces a stance signal 219. Stance signal 219 indicates whether leg support 101 is in the stance phase. Similarly, leg support 102 includes stance sensor 161, which produces a stance signal 220. Stance signal 220 indicates whether leg support 102 is in the stance phase. In some embodiments, stance sensors 160 and 161 are coupled to supports 101 and 102, respectively. In operation, signal processor 159 computes a torque profile according to inequalities (6) or (10), depending on whether stance signals 219 and 220 indicate if leg supports 101 and 102 are in either the stance phase or in the swing phase. In some embodiments, stance sensors 160 and 161 are located inside or within the soles of the human shoes (or boots). In some embodiments, stance sensors 160 and 161 are located inside the human shoe or boots. In some embodiments stance sensors 160 and 161 are connectable to the bottom of the human shoes or boots.

Further discussing the geometry of the exoskeleton shown in FIG. 1, in some embodiments, as shown in FIG. 1, exoskeleton trunk 109, in addition to other components, comprises two hip links, 114 and 115, rotatably connectable to thigh links 103 and 104 at hip flexion-extension joints 125 and 126, allowing for the flexion and extension of leg supports 101 and 102 about hip flexion-extension axes 151 and 152 respectively. In some embodiments, hip links 114 and 115 are rotatably connected to each other at hip abduction-adduction joint 113, allowing for abduction and/or adduction of leg supports 101 and 102. Abduction and adduction of leg supports 101 and 102 are shown by arrows 217 and 218, respectively.

Figure 10:
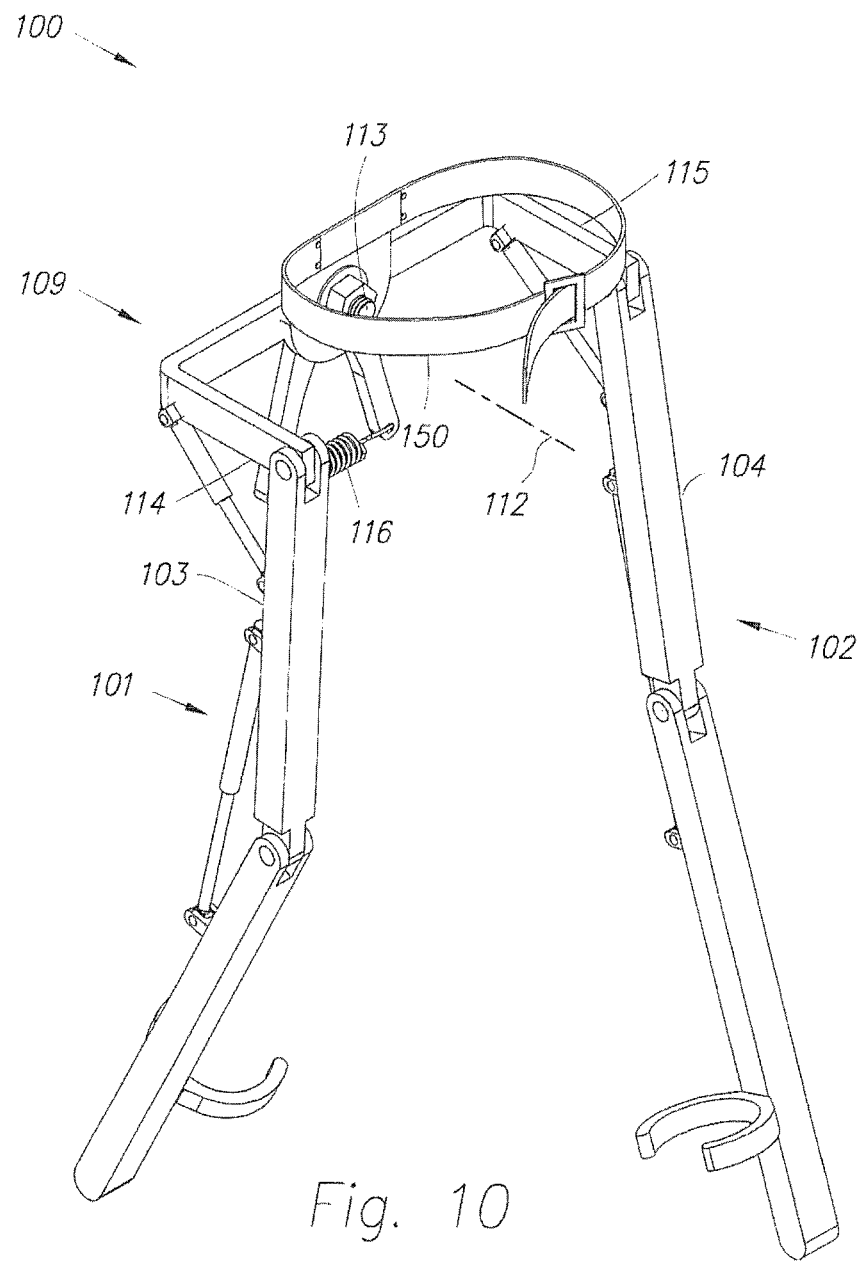
FIG. 10 is a perspective drawing of an alternative exoskeleton of the present invention including a hip resilient element.

FIG. 10 shows another embodiment of the invention where exoskeleton trunk 109 further comprises a hip resilient element 116 configured to apply a torque between hip links 114 and 115. Examples of a hip resilient element include, without limitation, extension spring, compression spring, leaf spring, gas spring, air spring, rubber, elastomer, surgical tube, bungee cord or combinations thereof. The stiffness of hip resilient element 116 may be chosen such that its force generally holds up the weight of the leg supports 101 or 102 during swing phase.

Figure 11:
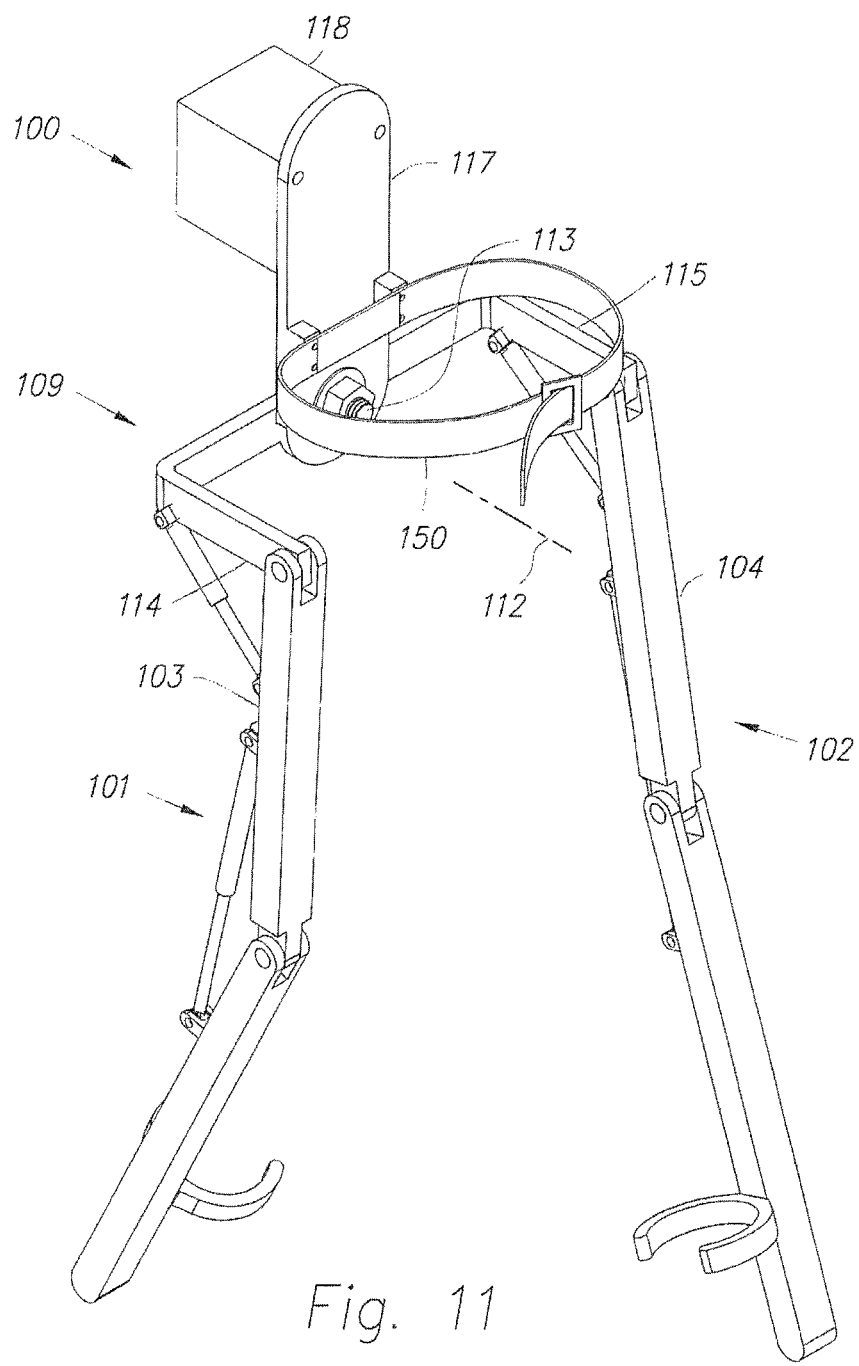
FIG. 11 is a perspective drawing of an alternative exoskeleton of the present invention including a connecting bracket for carrying a rear load.
Figure 12:
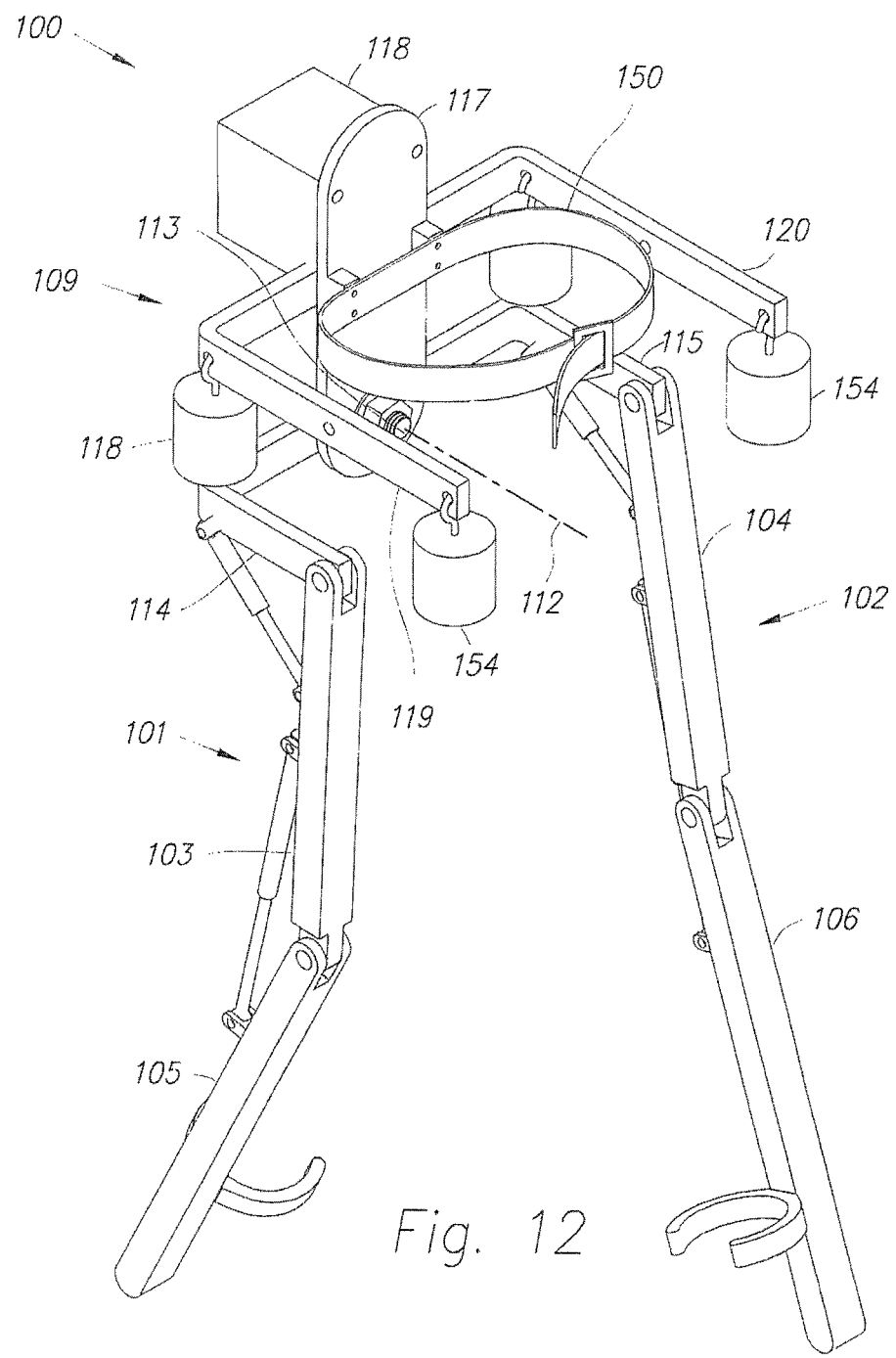
FIG. 12 is a perspective drawing of an alternative exoskeleton of the present invention including extension frames for carrying a front load.

In some embodiments, exoskeleton trunk 109 is configured to hold a rear load 118 behind person 187. FIG. 11 is a perspective drawing wherein exoskeleton trunk 109, among other components, further comprises a connecting bracket 117 configured to transfer the weight of a rear load 118 to exoskeleton trunk 109. In some embodiments, as shown in FIG. 12, connecting bracket 117 further comprises extension frames 119 and 120 configured to hold front load 154 in front of person 187. Examples of rear load 118 and front load 154 include without limitation, backpacks, baby carriers, food containers, sacks, boxes, water jugs, tool boxes, barrels, ammunition, weaponry, bedding, first aid supplies, golf bags, mail bags, cameras, steady cams, leaf blowers, compressors, electromechanical machineries and combinations thereof. In some embodiments, rear load 118 and/or front load 154 are another person being carried by person 187. In some embodiments, exoskeleton trunk 109 supports a portion of the weight of person 187 through human upper body interface device 150.

Figure 13:
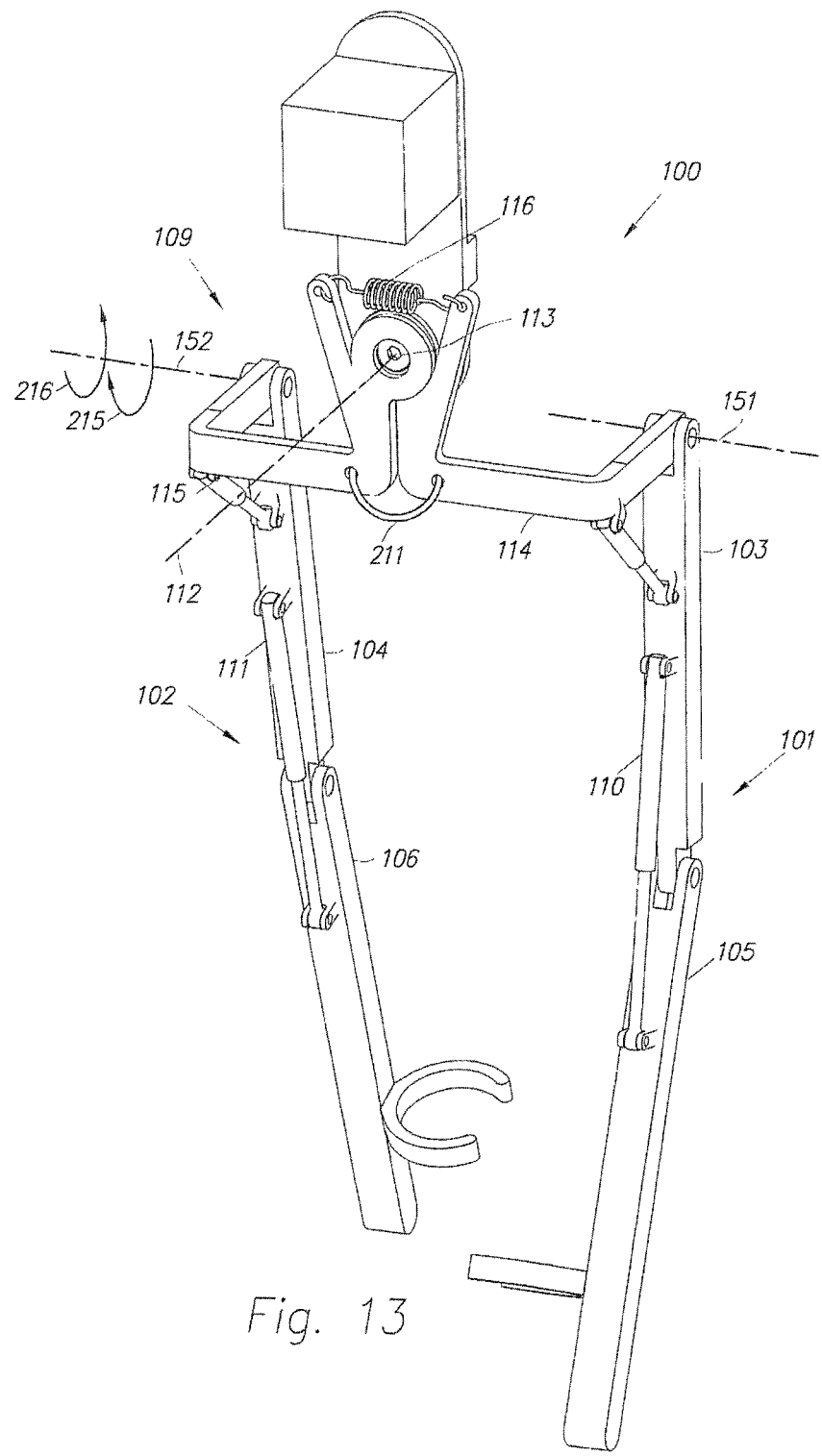
FIG. 13 is a perspective drawing of an alternative exoskeleton of the present invention including a hip abduction stop.

Some embodiments, as shown in FIG. 13, may also include a hip abduction stop 211 which limits or prevents hip links 114 and 115 from abducting with respect to each other. In the particular embodiment shown in FIG. 13, hip abduction stop 211 is created using a wire rope. Wire rope hip abduction stop 211 prevents abduction of leg supports 101 and 102 past some angle from occurring but allows adduction of leg supports 101 and 102.

Figure 14:
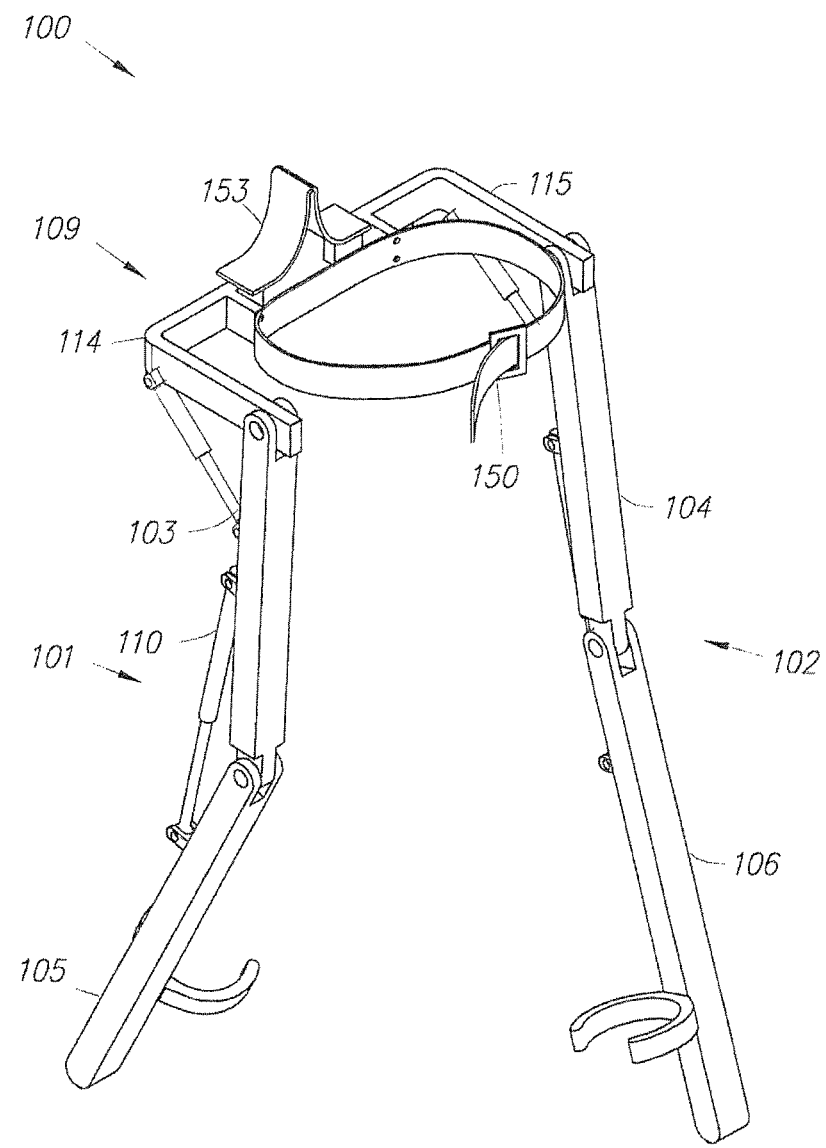
FIG. 14 is a perspective drawing of an alternative exoskeleton of the present invention including a hip resilient element in the form of a leaf spring.

In accordance with another embodiment of the invention, FIG. 14 is a perspective drawing where exoskeleton trunk 109 includes two hip links 114 and 115 rotatably connectable to thigh links 103 and 104, allowing for flexion and extension of leg supports 101 and 102 relative to exoskeleton trunk 109, wherein hip links 114 and 115 are compliantly connected to each other, allowing for abduction and/or adduction of leg supports 101 and 102. In the example shown in FIG. 14, this is accomplished by a leaf spring acting as hip resilient element 153.

Figure 15:
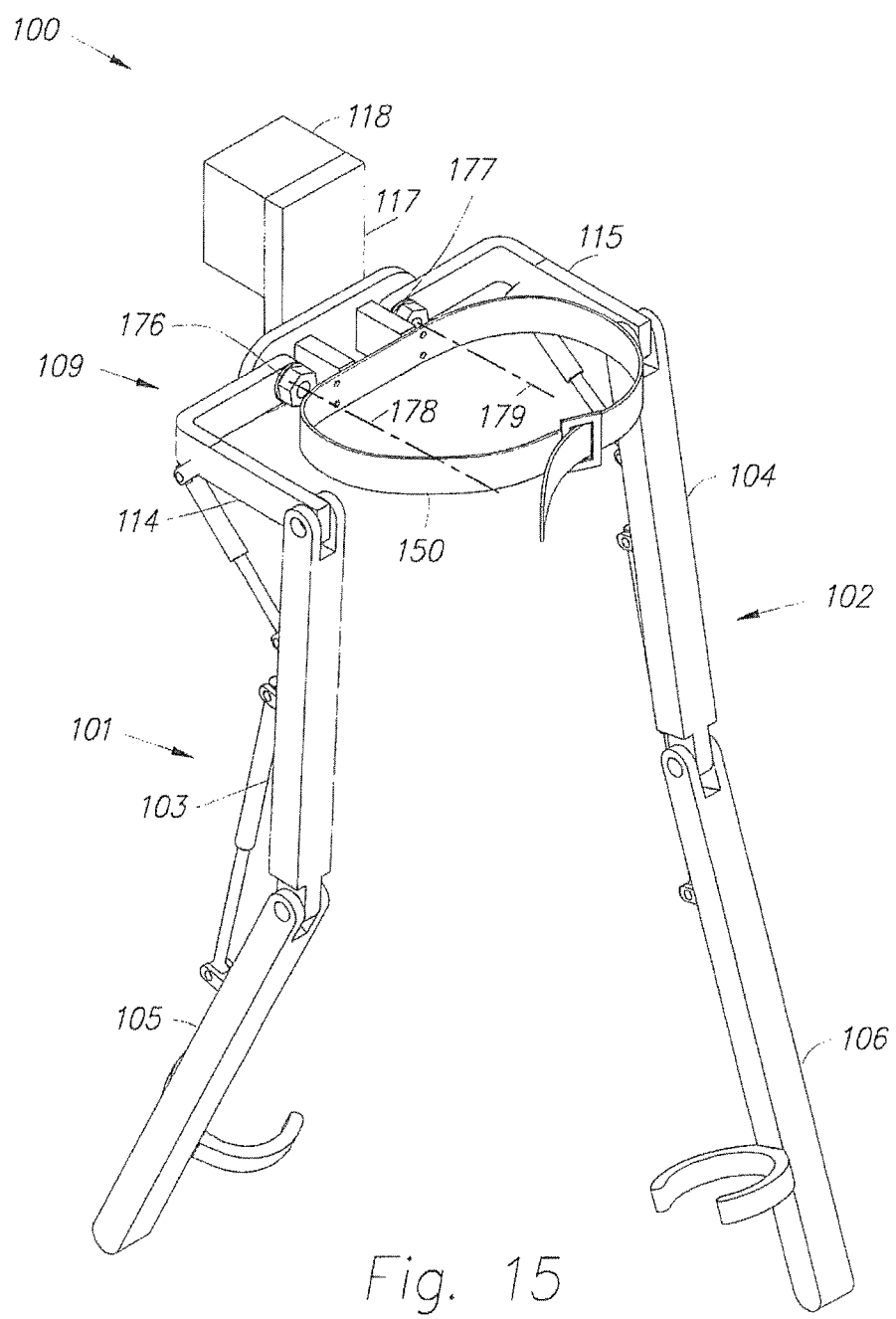
FIG. 15 is a perspective drawing of an alternative exoskeleton of the present invention including two hip resilient elements.

In accordance with another embodiment of the invention, FIG. 15 is a perspective drawing wherein exoskeleton trunk 109, among other components, further comprises a connecting bracket 117 configured to transfer the weight of a rear load 118 to exoskeleton trunk 109. Exoskeleton trunk 109 further comprises two hip links 114 and 115 rotatably connectable to thigh links 103 and 104, allowing for flexion and extension of leg supports 101 and 102 relative to exoskeleton trunk 109. Hip links 114 and 115 are rotatably connected to connecting bracket 117 via two hip abduction-adduction joints 176 and 177, and rotate about two hip abduction-adduction axes 178 and 179. In some embodiments, hip abduction-adduction axes 178 and 179 are generally parallel to each other. In some embodiments, hip abduction-adduction joints 176 and 177 coincide with each other. Furthermore, in some embodiments, as shown in FIG. 9 through 12, hip abduction-adduction joints 176 and 177 coincide with each other, forming hip abduction-adduction joint 113, and hip abduction-adduction axes 178 and 179 become one hip abduction-adduction axis 112.

Figure 16:
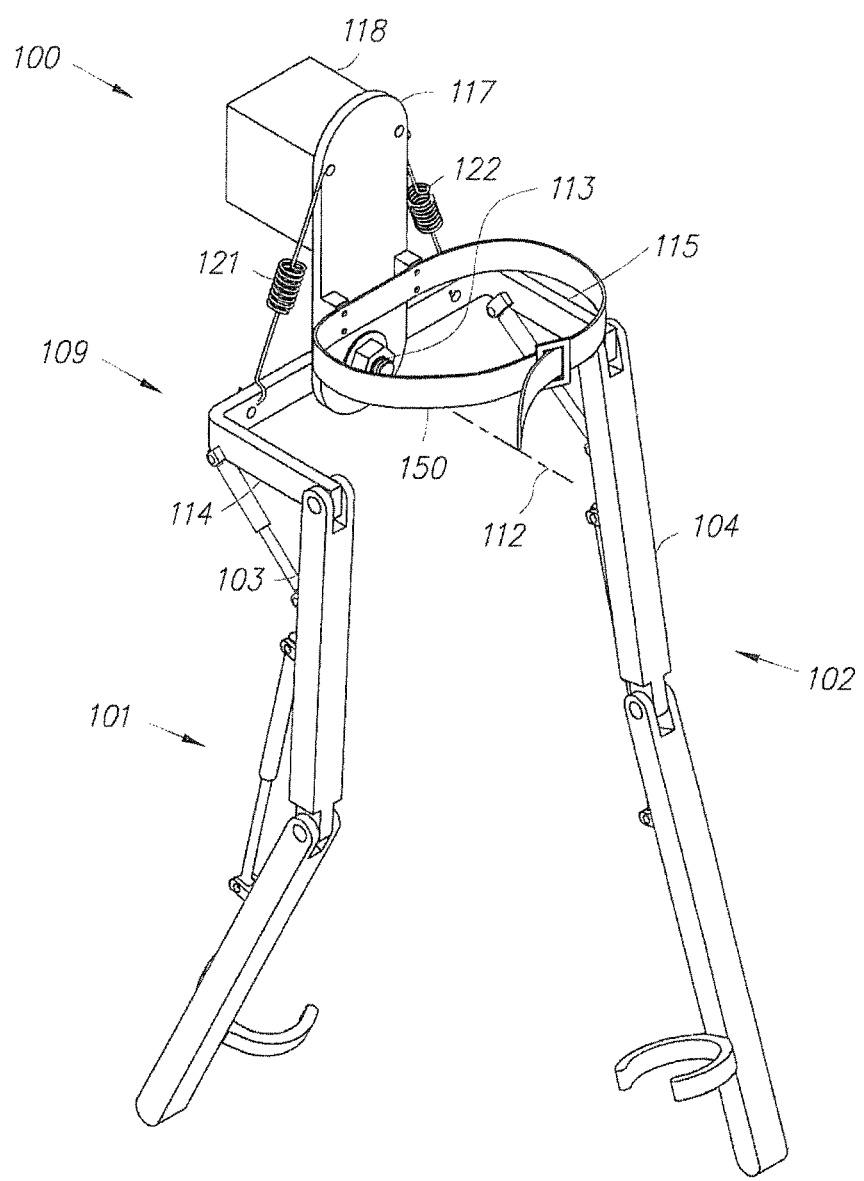
FIG. 16 is a perspective drawing of an alternative exoskeleton of the present invention including two hip joints.

In some embodiments, as shown in FIG. 16, exoskeleton trunk 109 further comprises abduction-adduction hip resilient elements 121 and 122, configured to apply torques between hip links 114 and 115 and connecting bracket 117. Examples of hip abduction-adduction resilient elements include, without limitation, extension spring, compression spring, gas spring, air spring, rubber, surgical tube, leaf springs, bungee cord and combinations thereof. The stiffness of abduction-adduction hip resilient elements 121 and 122 may be chosen such that its force generally holds up the weight of the leg supports 101 or 102 during swing phase and aid the person in keeping the load oriented vertically while walking.

Figure 17:
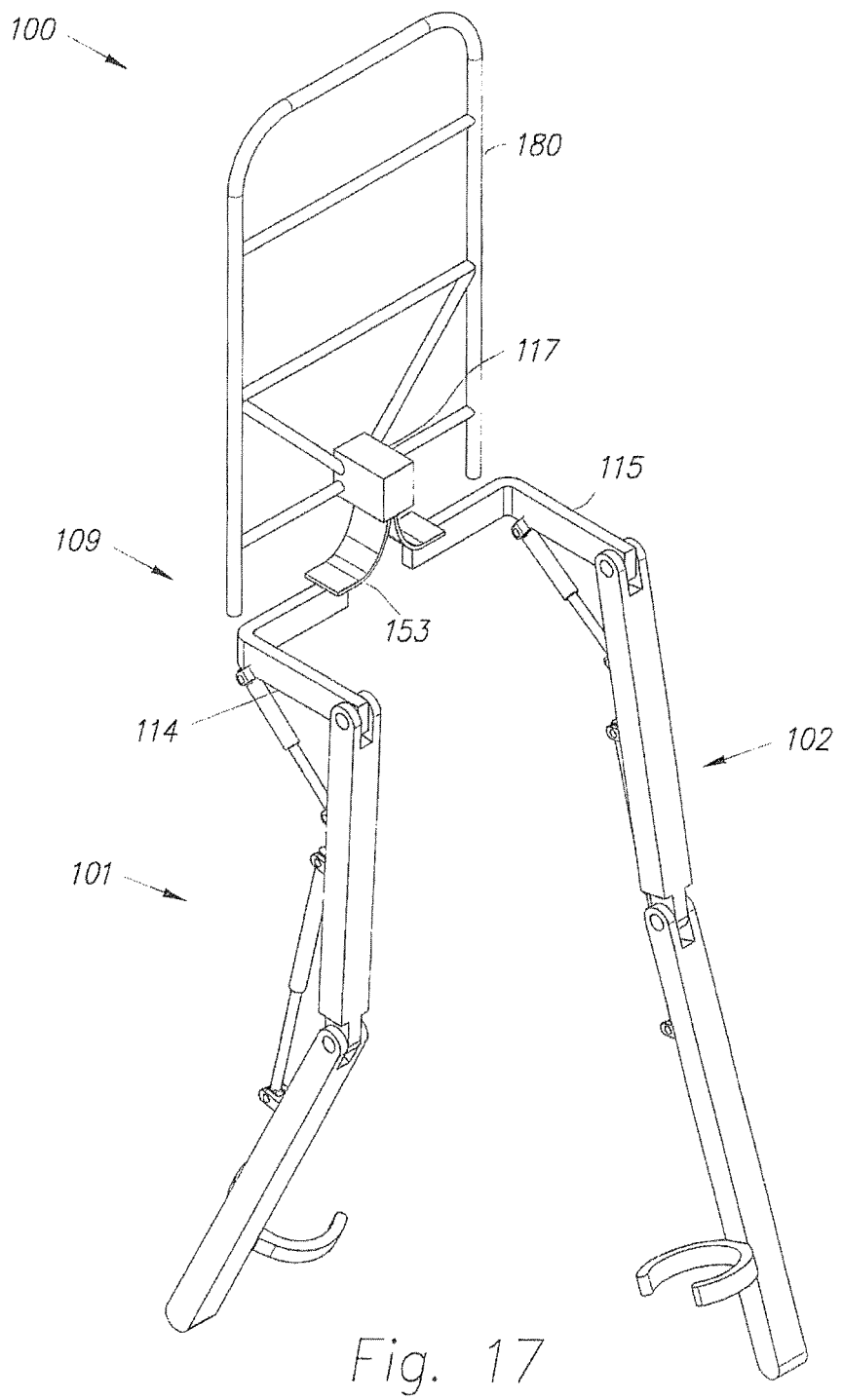
FIG. 17 is a perspective drawing of an alternative exoskeleton of the present invention including a back pack frame.

In some embodiments, as shown in FIG. 17, hip links 114 and 115 are compliantly connected to connecting bracket 117. In the embodiment shown in FIG. 17, this is accomplished by a hip resilient element 153, which in this case is a leaf spring. In some embodiments, as shown in FIG. 17, exoskeleton trunk 109 comprises a backpack frame 180 that allows a backpack to be coupled to lower extremity exoskeleton 100. In some embodiments, backpack frame 180 is connected to connecting bracket 117. The upper body interface devices 150 (such as a belt and shoulder straps) have been omitted in this figure for clarity; however, upper body interface devices 150, in some embodiments, can be coupled to backpack frame 180 or connecting bracket 117.

Figure 18:
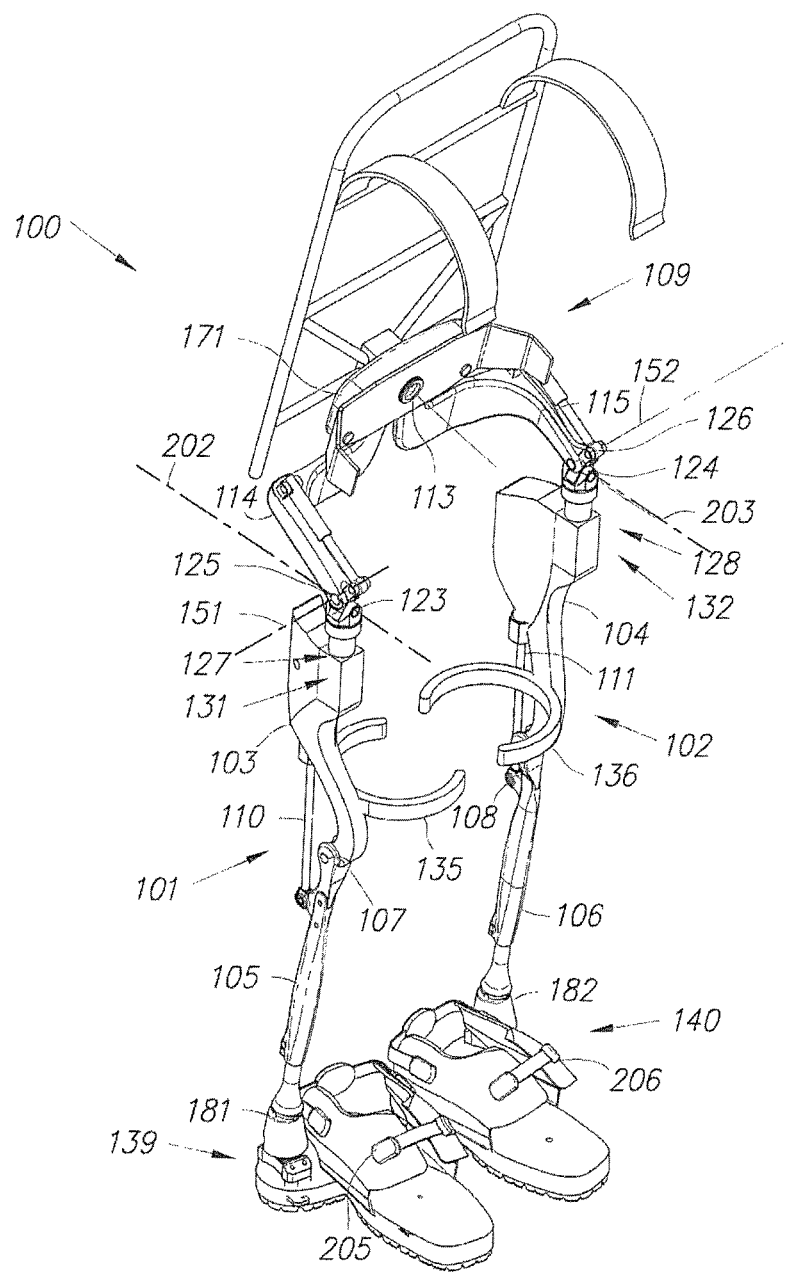
FIG. 18 is a perspective drawing of an alternative exoskeleton of the present invention including two hip resilient elements and exoskeleton feet.

In accordance with another embodiment, FIG. 18 is a perspective drawing wherein leg supports 101 and 102 further include thigh abduction-adduction joints 123 and 124, which are configured to allow abduction and/or adduction of leg supports 101 and 102 about thigh abduction-adduction axes 202 and 203, respectively. In some embodiments, thigh abduction-adduction joints 123 and 124 are located below hip flexion-extension joints 125 and 126. These joints are shown in greater detail in FIG. 19, which is a partial view of the same embodiment of FIG. 18.

Figure 19:
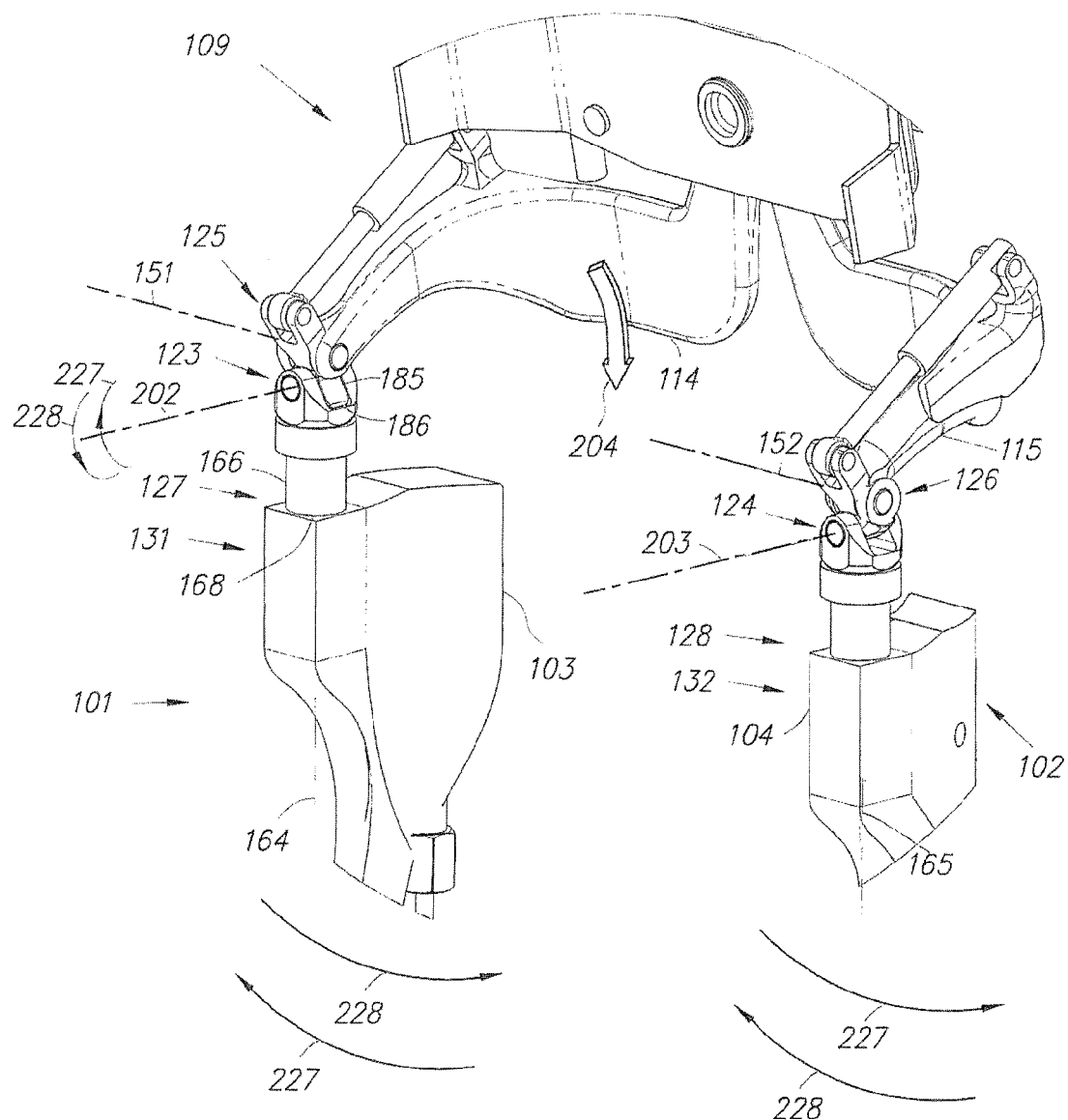
FIG. 19 is a partial view of the exoskeleton of FIG. 18, showing thigh joint details.

In some embodiments, as shown in FIG. 19, right leg support 101 includes a thigh adduction stop 185, which limits or prevents right thigh link 103 from adducting at thigh abduction-adduction joints 123 and 124. Abduction and adduction of right leg support 101 are shown by arrows 227 and 228, respectively. In the particular embodiment shown in FIG. 19, right thigh abduction-adduction joint 123 includes a thigh adduction stop 185, which bears on a thigh stop surface 186. Thigh adduction stop 185 limits the adduction of thigh abduction-adduction joint 123. The unrestricted adduction of right thigh abduction-adduction joint 123, during stance phase, would cause right hip link 114 to move downwardly along arrow 204 during stance phase, thereby dropping (lowering) the load. Such abduction-only joints for thigh abduction-adduction joints 123 and 124 are useful in allowing the person to squat naturally. In some embodiments, like the one shown in FIGS. 18 and 19, such abduction joints are generally located below hip flexion-extension joints 125 and 126.

Figure 20:
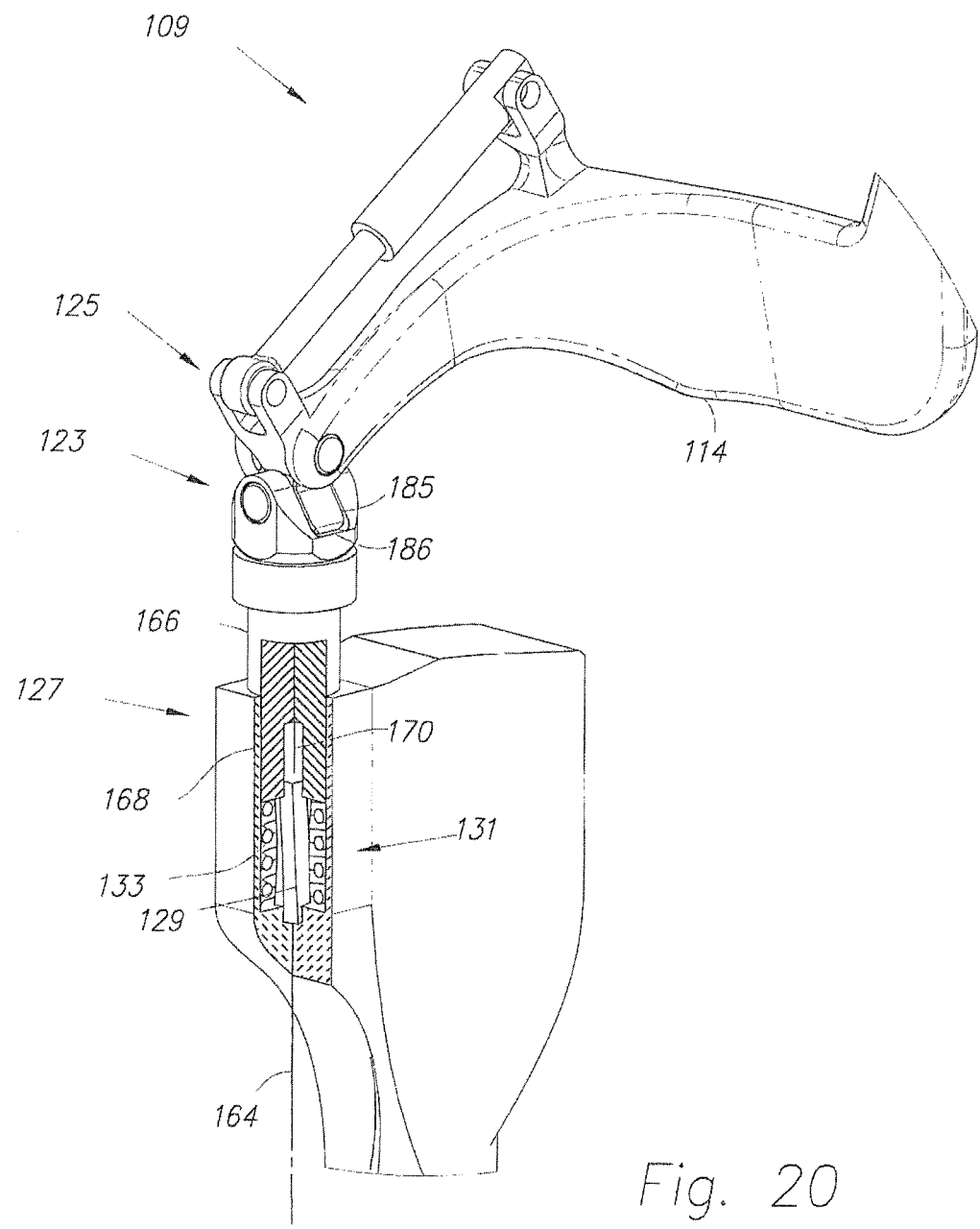
FIG. 20 is a partial view of the exoskeleton of FIG. 18, showing details of a compression-elongation mechanism.

In some embodiments, as shown in FIGS. 18 and 19, leg supports 101 and 102 further include leg rotation joints 127 and 128 configured to allow rotation of leg supports 101 and 102. Leg rotation joints 127 and 128 are generally located above knee joints 107 and 108. Lines 164 and 165 represent the leg rotation axes of leg rotation joints 127 and 128. In FIGS. 19 and 20, this is accomplished by providing for a sliding contact between the right hip rotation shaft 166 and the right hip rotation journal 168. The parts included in the joint which prevent it from pulling apart have been omitted for simplicity, but one skilled in the art will note that there are many ways of retaining such shafts in such journals.

In some embodiments, as shown in FIG. 20, leg rotation joints 127 and 128 further comprise a rotation resilient element 129. This rotation resilient element acts as a torsion spring and provides a restoring torque, which generally restores the leg support back to the neutral position shown in FIG. 18 from an extended position (not shown). Rotation resilient element 129 can be constructed in many ways, with the particular cross section shown in FIG. 20 being advantageous when using an elastomeric material to construct the element. Rotation resilient element 129 is shown partially deflected for illustration purposes.

Also, in some embodiments, as shown in FIG. 19 and FIG. 20, leg supports 101 and 102 further comprise compression-elongation mechanisms 131 and 132, configured to change the distance between exoskeleton trunk 109 and the respective knee flexion-extension joints 107 and 108. In some embodiments, compression-elongation mechanisms 131 and 132 allow for changes in the distance between the hip flexion-extension joints 125 and 126 and the respective flexion-extension knee joints 107 and 108. The compression-elongation mechanisms contract by right hip rotation shaft 166 sliding further into the right hip rotation journal 168 (shown for right leg 101 only). The leg rotation resilient element 129 is allowed to slide into a clearance cavity 170. In some embodiments, compression-elongation mechanism 131 and 132 further comprise a right leg compression-elongation resilient element 133. This leg compression-elongation resilient element acts as a spring and provides a restoring force, which generally restores the leg support back to a neutral configuration from an extended configuration. In the embodiment of FIG. 20, this is illustrated by a helical compression spring.

Figure 21:
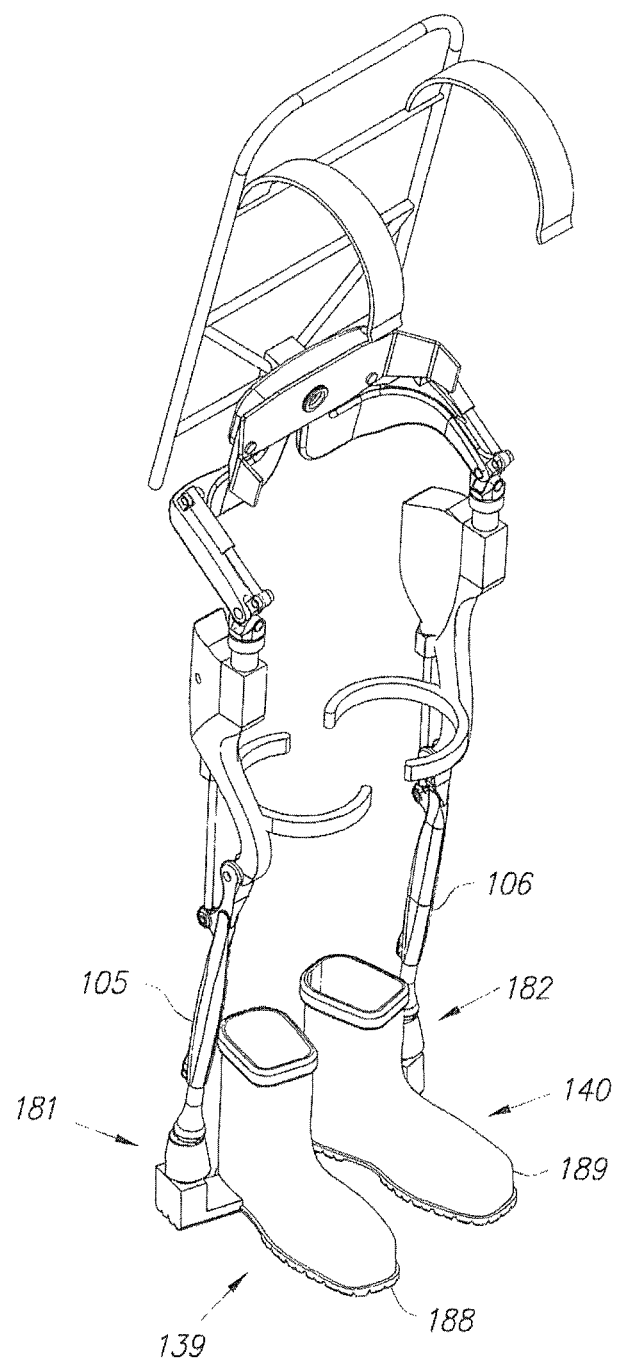
FIG. 21 is a perspective drawing of an alternative exoskeleton of the present invention including shoes.
Figure 22:
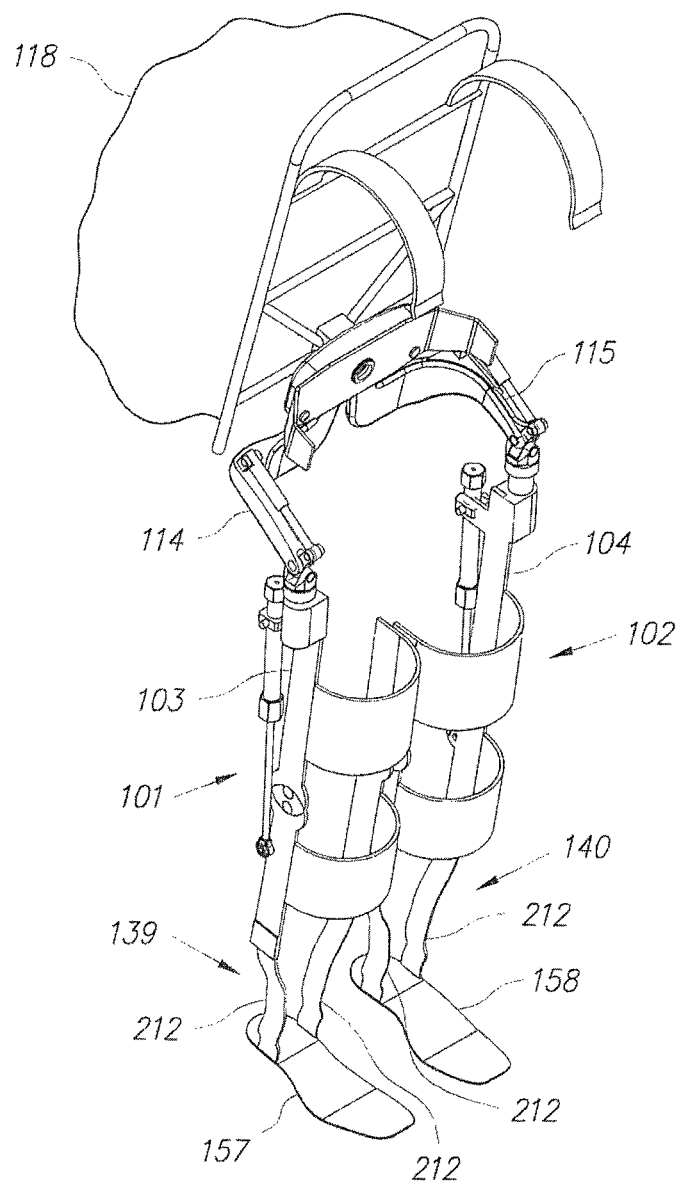
FIG. 22 is a perspective drawing of an alternative exoskeleton of the present invention including insoles.

In some embodiments, as shown in FIG. 18, exoskeleton hip mechanism cover 171 may cover some components of exoskeleton, including parts of hip links 114 and 115, hip resilient element 116 or abduction-adduction hip resilient elements 121 and 122. In some embodiments, as shown in FIG. 18, leg supports 101 and 102 further comprise exoskeleton feet 139 and 140, coupled to shank links 105 and 106, respectively, allowing the transfer of forces from shank links 105 and 106 to the ground. In operation, exoskeleton feet 139 and 140 are configurable to be coupled to the feet of person 187. In some embodiments, as shown in FIG. 18, the coupling to person's feet is accomplished by using clam-shell type bindings 205 and 206, as sometimes found on modern snow shoes. However, there are a great number of methods to make such a connection, as can be seen on different types of snow skis, snowboards, snowshoes and other such devices. In some embodiments, as shown in FIG. 21, exoskeleton feet 139 and 140 comprise exoskeleton shoes 188 and 189, wearable by person 187, thereby allowing exoskeleton feet 139 and 140 to couple to the feet of person 187. In some embodiments, as shown in FIG. 22, exoskeleton feet 139 and 140 comprise exoskeleton insoles 157 and 158, insertable inside the person's shoes, allowing exoskeleton feet 139 and 140 to couple to the feet of person 187. Insoles 157 and 158 are flexible and therefore can bend to match the curvature of the human foot during maneuvers such as squatting. Also, the insole side supports 212 are either compliant or configured to include degrees of freedom to mimic the movement of the human ankle.

Figure 23:
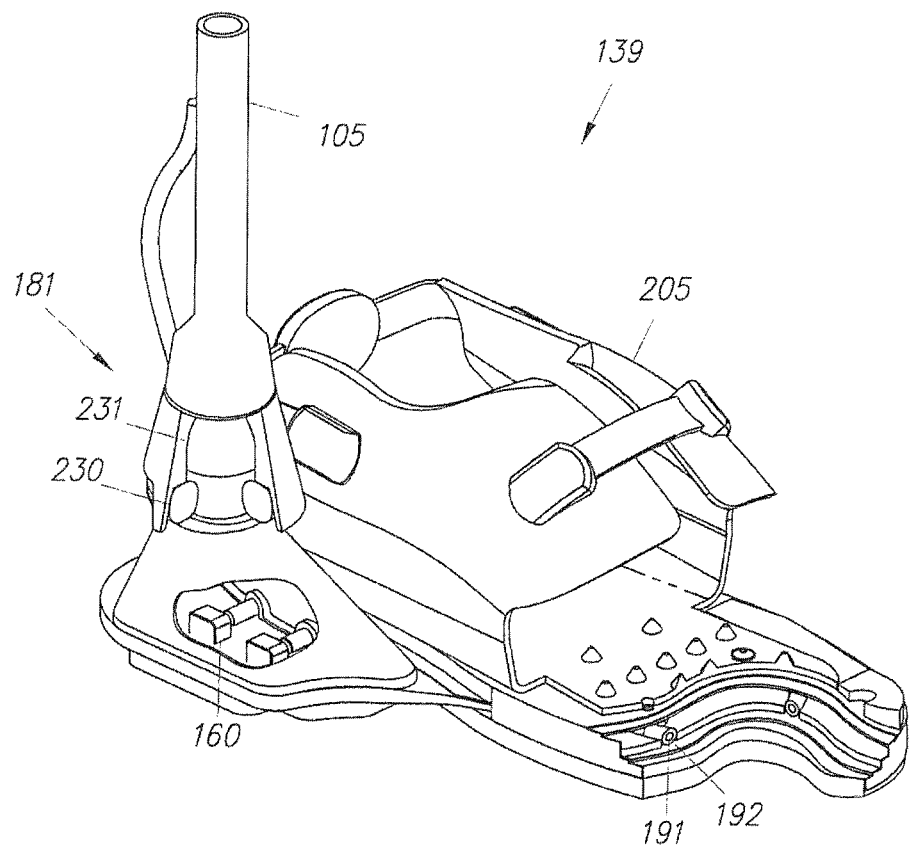
FIG. 23 is partial view of an exoskeleton foot of FIG. 18 including a ball and socket joint.

In some embodiments, as shown in FIG. 18, exoskeleton feet 139 and 140 are compliantly coupled to shank links 105 and 106. This is accomplished using ankle resilient elements 181 and 182. FIG. 23 shows a close-up view of right exoskeleton foot 139. In this example, right ankle resilient element 181 is constructed of a metal ball-and-socket joint 231 surrounded by a doughnut shaped elastomer element 230, which creates compliance in all directions of rotations.

Figure 24:
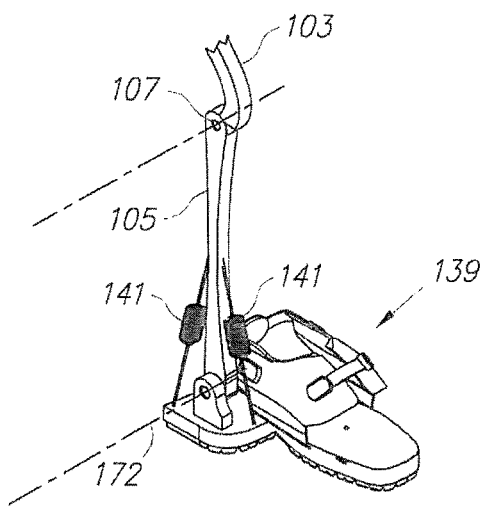
FIG. 24 is a perspective drawing of an alternative exoskeleton foot of the present invention including resilient elements.

In some embodiments, exoskeleton feet 139 and 140 rotate about two plantar-dorsi flexion axes relative to shank links 105 and 106. FIG. 24 shows an embodiment of this type of exoskeleton where right ankle plantar-dorsi flexion axis 172 is generally parallel to the plantar-dorsi flexion axis in the human ankle. In some embodiments, each leg support further comprises at least one ankle plantar-dorsi flexion resilient element 141 resisting the rotation of respective exoskeleton foot about right ankle plantar-dorsi flexion axis 172.

Figure 25:
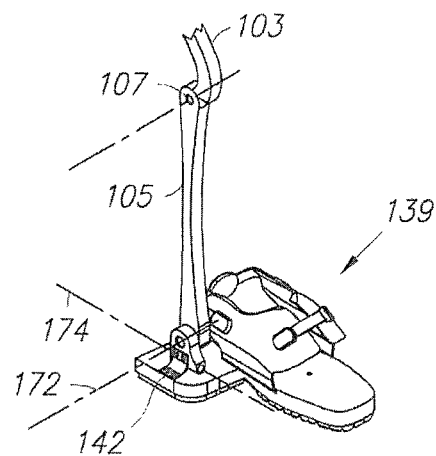
FIG. 25 is a perspective drawing of an alternative exoskeleton foot of the present invention including an abduction-adduction resilient element.

In some embodiments, exoskeleton feet 139 and 140 rotate about two ankle abduction-adduction axes relative to shank links 105 and 106. FIG. 25 shows an embodiment of this type of exoskeleton where right ankle abduction-adduction axis 174 is generally parallel to the abduction-adduction axis in the human ankle. In some embodiments, each leg support further comprises at least one ankle abduction-adduction resilient element 142 resisting the rotation of right exoskeleton foot 139 about right ankle abduction-adduction axis 174, as depicted in FIG. 25.

Figure 26:
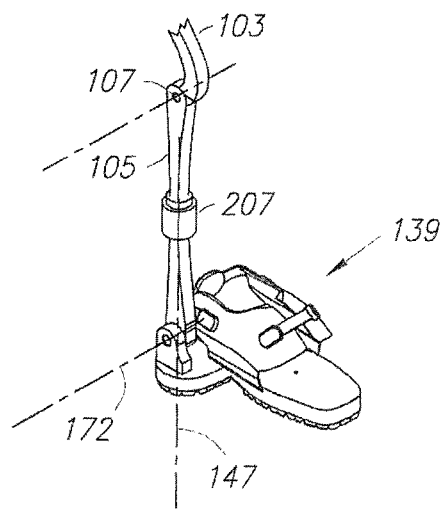
FIG. 26 is a perspective drawing of an alternative exoskeleton foot of the present invention including a shank rotating joint.

In some embodiments, exoskeleton feet 139 and 140 rotate about an ankle rotation axes 147 relative to shank links 105 and 106. In some embodiments, as shown in FIG. 26, this is accomplished using a shank rotation joint 207, which functions similar to leg rotation joint 127. FIG. 26 shows an embodiment of this type of exoskeleton where right ankle rotation axis 147 is generally parallel to the rotation axis in the human ankle. In some embodiments, resilient elements can be included in the ankle to resist the rotation of right exoskeleton foot 139 about right ankle rotation axis 147.

Figure 27:
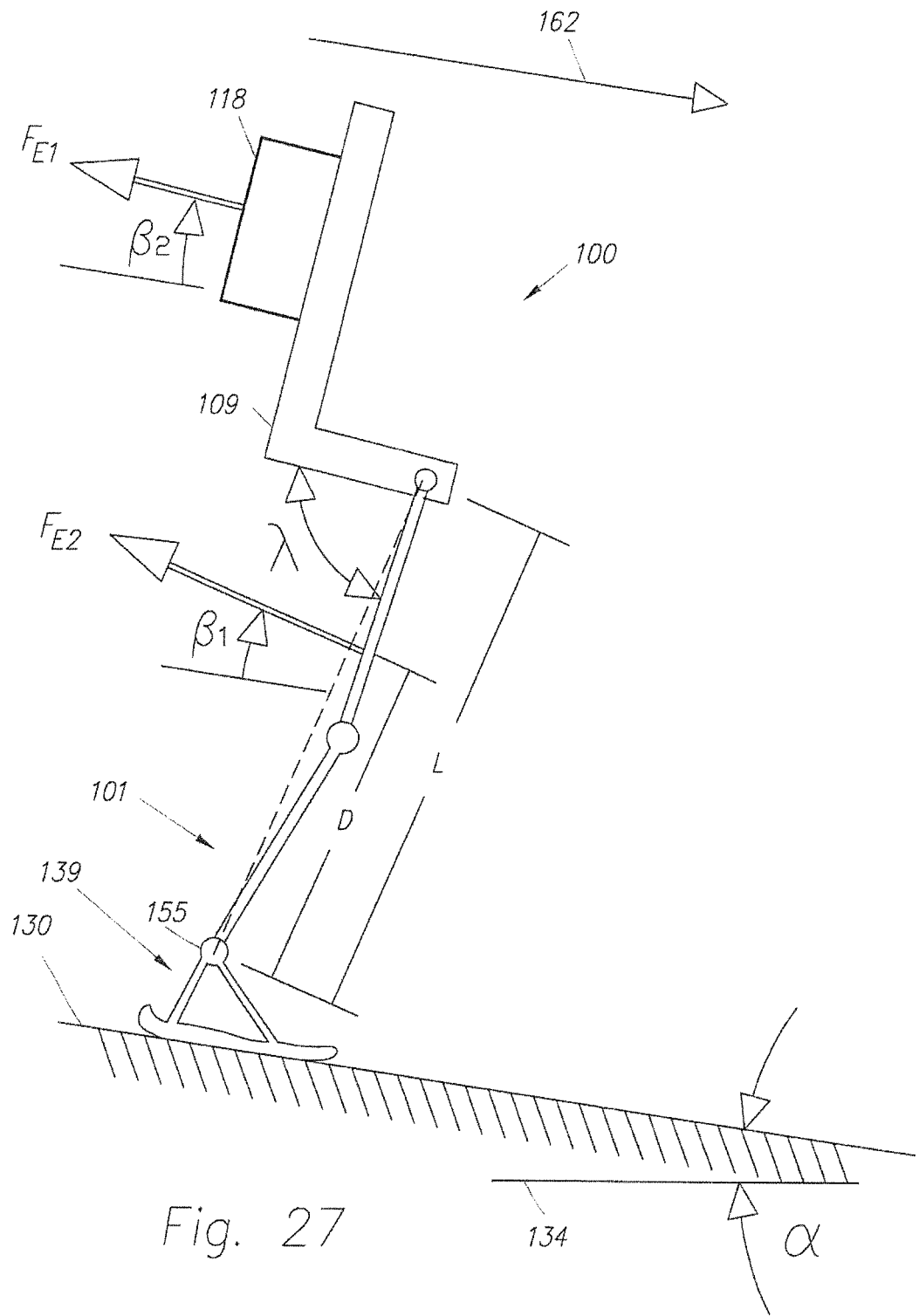
FIG. 27 depicts forces and dimensions associated with an alternative exoskeleton of the present invention in a stance phase.

FIG. 27 shows an embodiment of the embodiment of FIG. 5 where right exoskeleton foot 139 has been added. The analysis described above on the power transfer between person 187 and lower extremity exoskeleton 100 applies to the exoskeleton in FIG. 27, if one assumes the rotation of right leg support 101 about point F in FIG. 5 occurs at right ankle point 155.

Figure 28:
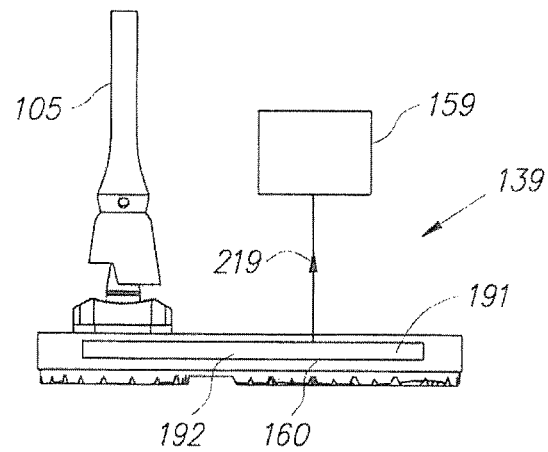
FIG. 28 is a partial cross-sectional side view of an alternative exoskeleton foot of the present invention including an integrated stance sensor.

In some embodiments, as shown in FIG. 28, stance sensors 160 and 161 are integrated into exoskeleton feet 139 and 140. In some embodiments, as shown in FIG. 28, stance sensor 160 is a pressure sensor measuring the pressure in a media 191 trapped in a stance sensor cavity 192 inside right exoskeleton foot 139. FIG. 23 shows an embodiment where a tube is used as a stance sensor cavity 192. In some cases, the stance signals 219 and 220 may take the form of the media 191 itself transported in a small tube from stance sensor cavity 192 to signal processor 159.

Figure 29:
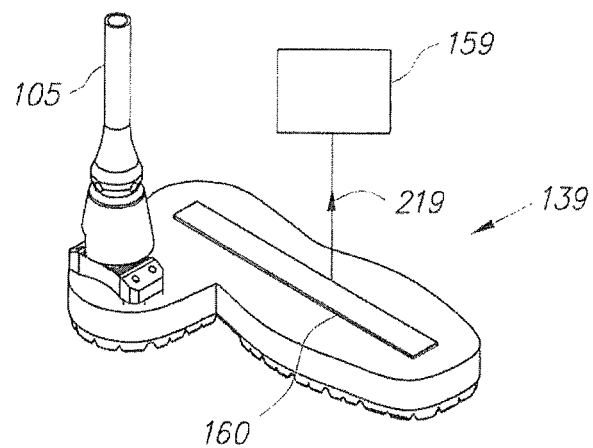
FIG. 29 is a top perspective view of an alternative exoskeleton foot of the present invention including a force sensor.
Figure 30:
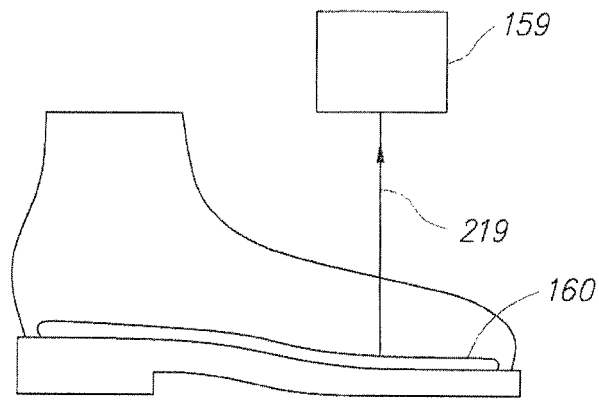
FIG. 30 is a partial cross-sectional side view of an alternative shoe of the present invention including an integrated stance sensor.
Figure 31:
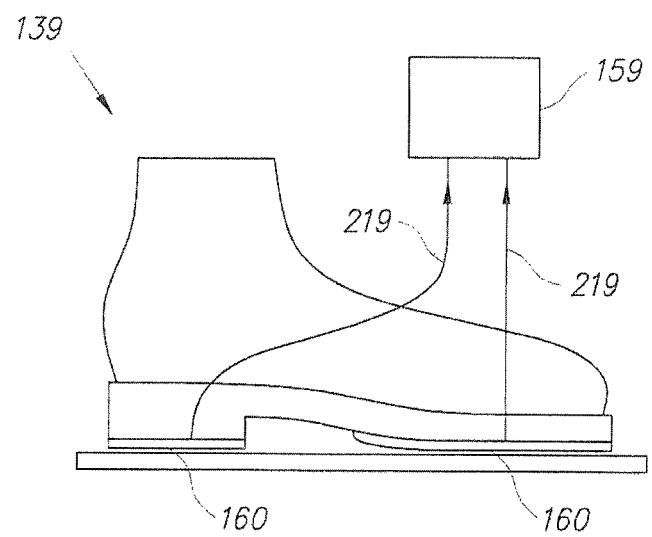
FIG. 31 is a partial cross-sectional side view of an alternative shoe of the present invention including a sole-mounted stance sensor.
Figure 32:
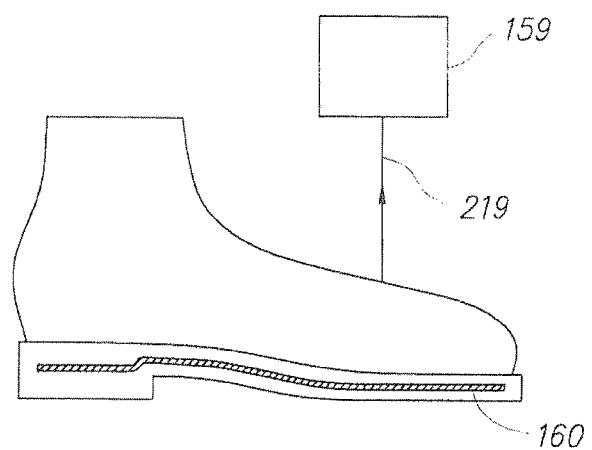
FIG. 32 is a partial cross-sectional side view of an alternative shoe of the present invention including a force sensor incorporated into the shoe sole.

FIG. 29 shows another embodiment wherein stance sensor 160 is a force sensor connectable to right exoskeleton foot 139. In some embodiments, as shown in FIG. 30, stance sensor 160 is located inside the human shoe like an insole and its output signal represents the force on the bottom of the human foot. This type would be particularly useful in embodiments of the invention such as those shown in FIG. 21 or 22. In some embodiments, as shown in FIG. 31, stance sensor 160 is connected to the bottom of the human shoe and senses the force on the bottom of the human foot. In some embodiments, as shown in FIG. 32, stance sensor 160 is located inside the human shoe sole and senses the force on the bottom of the human foot. In some embodiments, stance sensors 160 and 161 are coupled to shank links 105 and 106, respectively. Stance sensor 160 comprises any sensor or combination of sensors capable of performing the indicated functions. Examples of stance sensor 160 include, without limitation, force sensors, strain-gage based force sensors, piezoelectric force sensors, force sensing resistors, pressure sensors, switches, tape switches and combinations thereof. In some embodiments stance sensor 160 is a switch that represents the existence of a force greater than some threshold force on the bottom of the foot of person 187.

Figure 33:
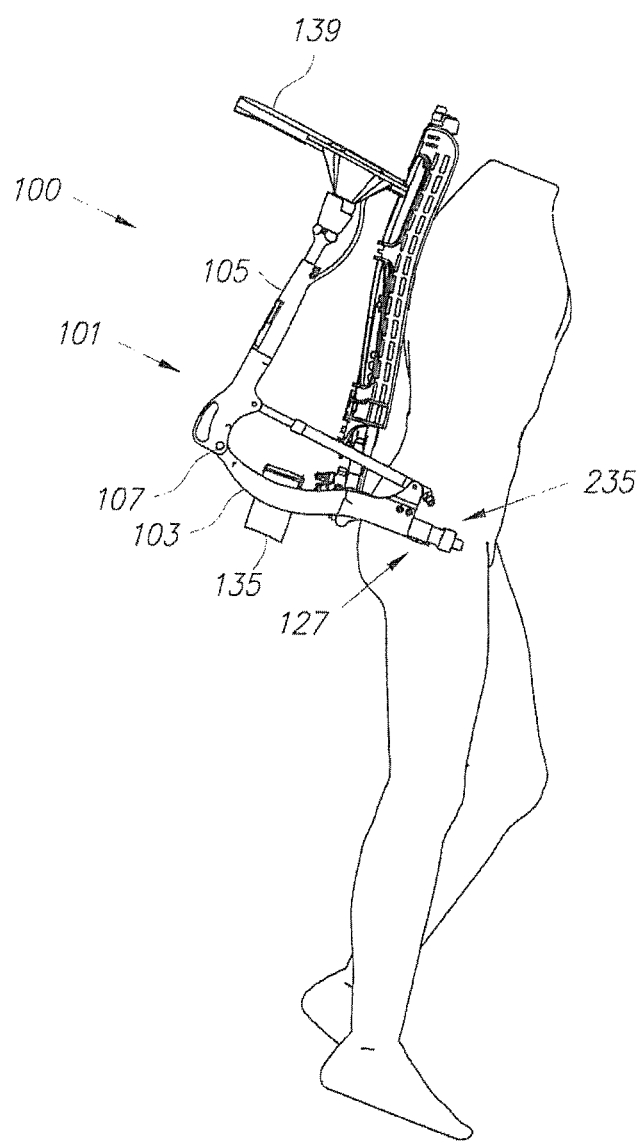
FIG. 33 is a side view of an alternative exoskeleton of the present invention carried in a vertical stowed position.
Figure 34:
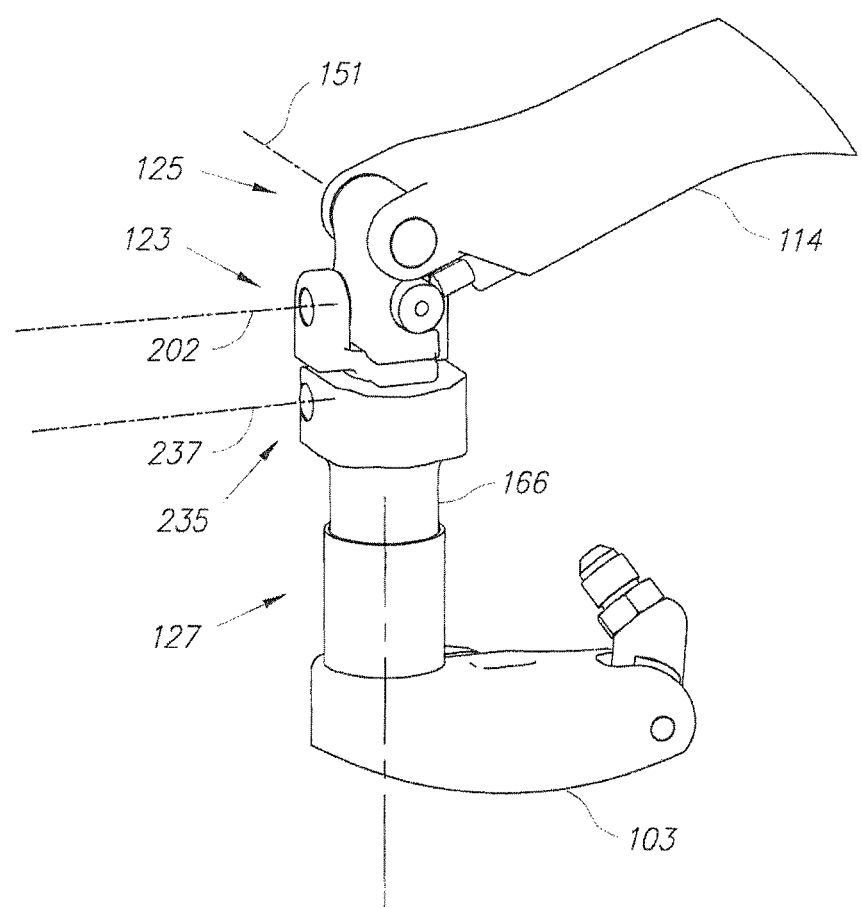
FIG. 34 is a partial perspective view of the exoskeleton of FIG. 33.

Also shown in FIG. 33 is an additional thigh abduction-adduction joint 235, which is included in order to allow the leg to be stowed in a vertical position when the exoskeleton is not in use but needs to be carried. Right leg support 101 can abduct along an additional right thigh abduction-adduction axis 237 (depicted in FIG. 34). This may be desirable if person 187 no longer has a very heavy load to carry but needs to transport lower extremity exoskeleton 100. In that case, the operator may unstrap the exoskeleton's right leg support 101 and swing the leg outward from his or her body until the right exoskeleton foot 139 is in the air over the operator's head. Then, by bending the right knee joint 107 and/or rotating the right leg rotation joint 127, the leg can be positioned such that it stows behind the operator, as shown in FIG. 33. This is possible because the right thigh abduction-adduction joint 123 and the additional right thigh abduction-adduction joint 235 each allow for a rotation of approximately ninety degrees about the right thigh abduction-adduction axis 202 and the additional right thigh abduction-adduction axis 237, respectively. The total abduction therefore possible is over 180 degrees. This could be accomplished with one thigh abduction-adduction joint which has 180 degrees of travel, but designing such a joint would cause the designer to move the pivot point of the joint outward from the operator a great deal, which would result in a wider exoskeleton design. This is undesirable but is a viable alternative design.

In some embodiments, lower extremity exoskeleton 100 (as shown in FIG. 1) comprises two torque generators 110 and 111, which are configured to allow flexion of knee joints 107 and 108 during swing phase and resist flexion of knee joints 107 and 108 during stance phase, thereby allowing the lower extremity exoskeleton 100 to bear a load and transfer the load forces (e.g., load weight) to the ground. In some embodiments, torque generators 110 and 111 are hydraulic torque generators. In accordance with some embodiments, torque generators 110 and 111 are hydraulic piston cylinders where the motion of the piston relative to the cylinder creates hydraulic fluid flow into or out of the cylinder. In operation, the hydraulic fluid flow into or out of the cylinder may be controlled by a hydraulic valve. The smaller the hydraulic valve orifice size is, the more force is needed to move the piston relative to the cylinder with a given speed. In other words, the more damped the motion of the piston relative to the cylinder needs to be, the smaller the hydraulic valve orifice size should be. If the hydraulic valve orifice size is large, then a small force is required to move the piston relative to the cylinder. Here, impedance of hydraulic torque generators 110 and 111 is defined as the ratio of the required force over the velocity in frequency domain. With this definition, the smaller the hydraulic valve orifice size is, the larger the impedance of the hydraulic torque generator will be.

Figure 35:
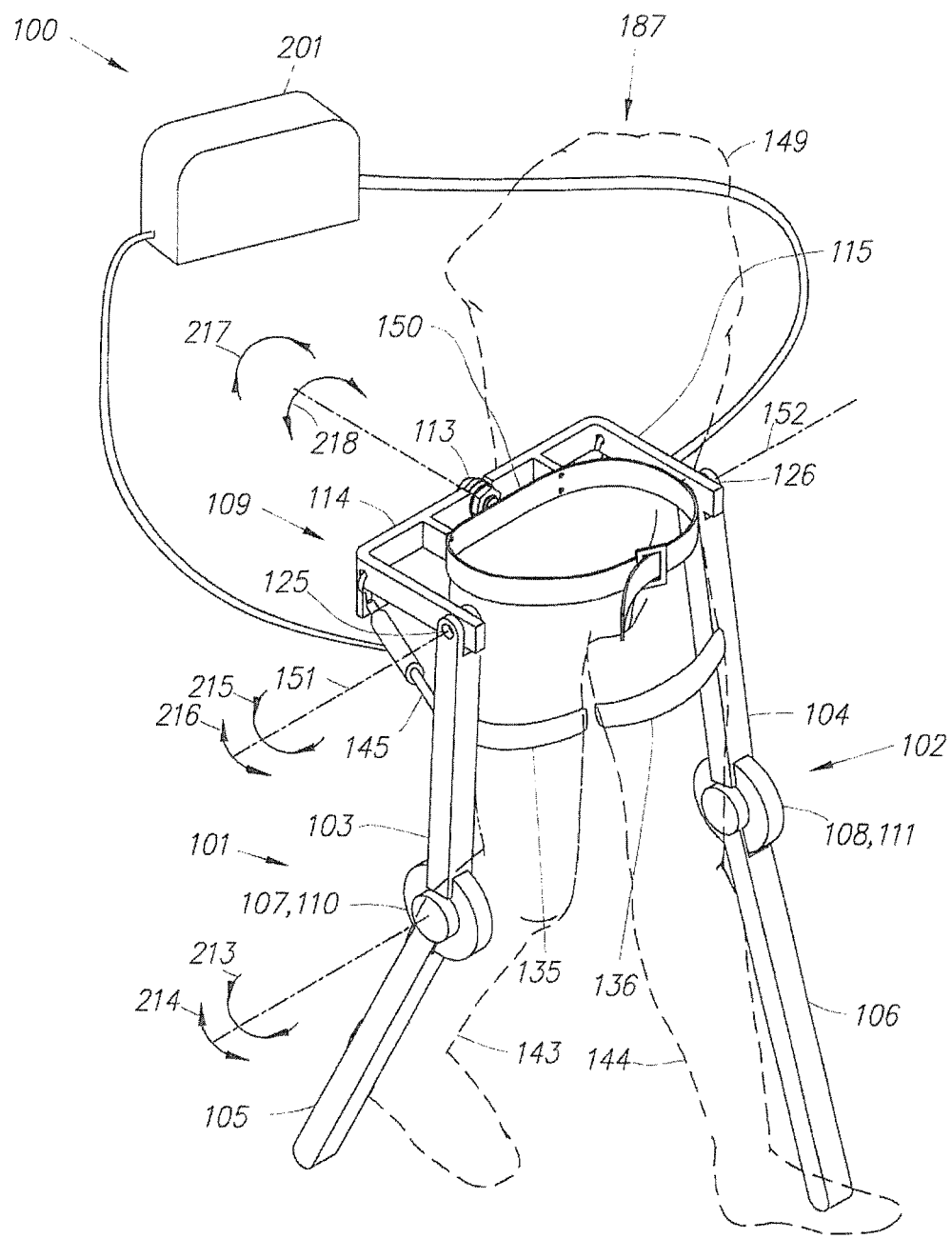
FIG. 35 is a perspective drawing of an alternative exoskeleton foot of the present invention including hydraulic rotary dampers.

In some embodiments, as shown in FIG. 35, torque generators 110 and 111 are hydraulic rotary dampers where the torque produced may be controlled by a hydraulic valve. The smaller the hydraulic valve orifice size is, the more torque is needed to rotate the hydraulic rotary damper with a given speed. In other words, the more damped the rotation of the hydraulic rotary damper needs to be, the smaller the hydraulic valve orifice size should be. Here impedance of hydraulic rotary dampers 110 and 111 is defined as the ratio of the required torque over the angular velocity in frequency domain. With this definition, the smaller the hydraulic valve orifice size is, the larger the impedance of the hydraulic rotary damper will be.

In some embodiments, torque generators 110 and 111 are friction brakes where one can control the resistive torque on knee joints 107 and 108 by controlling the friction torques. In other embodiments, torque generators 110 and 111 are viscosity based friction brakes where one can control the resistive torque on knee joints 107 and 108 by controlling the viscosity of the fluid. In other embodiments, torque generators 110 and 111 are Magnetorheological Fluid Devices where one can control the resistive torque on knee joints 107 and 108 by controlling the viscosity of the Magnetorheological Fluid. One skilled in the art realizes that any of the above devices can be mounted in the invention to function in the same way as the hydraulic rotary dampers shown in FIG. 35.

In some embodiments, signal processor 159 is configured to control torque generators 110 and 111. Signal processor 159 controls the resistance to flexion in knee joints 107 and 108 as a function of stance signals 219 and 220. For example, when right stance sensor 160 detects the stance phase in right leg support 101, signal processor 159 will increase the impedance of right torque generator 110 so that right knee joint 107 resists flexion. Conversely, when right stance sensor 160 detects the swing phase in right leg support 101, signal processor 159 will decrease the impedance of right torque generator 110 so that no resistance to flexion occurs in right knee joint 107. Similarly, when stance sensor 161 detects the stance phase in left leg support 102, signal processor 159 will increase the impedance of left torque generator 111 so that left knee joint 108 resists flexion. Conversely, when left stance sensor 161 detects the swing phase in left leg support 102, signal processor 159 will decrease the impedance of left torque generator 111 so that no resistance to flexion occurs in left knee joint 108. Large impedances of torque generators 110 and 111 lead to large resistance of knee joints 107 and 108 to flexion needed during stance phase. Conversely, small impedances of torque generators 110 and 111 lead to small resistance of knee joints 107 and 108 to flexion needed during swing phase. In some embodiments, signal processor 159 is mounted to torque generators 110 and 111.

In practice, the resistance to flexion in knee joints 107 and 108 during the stance phase need not be constant. In some embodiments, the resistance to flexion at the beginning of the stance phase (approximately the first 20% of the stance cycle) may be extremely high (i.e., knee joints 107 and 108 will be locked in the beginning of stance). During the middle of the stance phase (approximately the 20% to 80% of the stance cycle), the resistance to flexion may be lower, but high enough that knee joints 107 and 108 will only undergo a few degrees of flexion. During the end of the stance cycle (approximately the last 20% of the stance cycle), the resistance to flexion may be low, but still nonzero, so that knee joint 107 and 108 may flex in preparation for the swing cycle.

In some embodiments, each of leg supports 101 and 102 further comprises a torque generator wherein each torque generator comprises a hydraulic piston-cylinder. In these embodiments, power unit 201, among other components, comprises at least one knee hydraulic circuit 190 connectable to torque generators 110 and 111. Knee hydraulic circuit 190 is configured to modulate the fluid flow to torque generators 110 and 111. In operation (using right leg support 101 as an example), when right leg support 101 is in a stance phase, knee hydraulic circuit 190 is configured to restrict the fluid flow to right torque generator 110 of right leg support 101. Knee hydraulic circuit 190, when leg support 101 is in a swing phase, is configured to allow the fluid flow to right torque generator 110 of right leg support 101. In other words, knee hydraulic circuit 190, when leg support 101 is in a stance phase, is configured to increase the resistance to flexion of right knee joint 107. Knee hydraulic circuit 190, when leg support 101 is in a swing phase, is configured to decrease the resistance to flexion of right knee joint 107. The above behavior is also true for leg support 102. In some embodiments of the invention, lower extremity exoskeleton 100 further comprises at least one stance sensor 160 and 161 for each of leg supports 101 and 102. Stance sensors 160 and 161 produce stance signals 219 and 220, indicating whether leg supports 101 and 102 are in the stance phase. In some embodiments, knee hydraulic circuit 190 and hydraulic circuit 194 may be coupled to each other or share components. In some embodiments, one knee hydraulic circuit 190 may be used for both torque generator 110 and 111, or each of torque generators 110 and 111 may connect to an independent knee hydraulic circuit 190.

Figure 36:
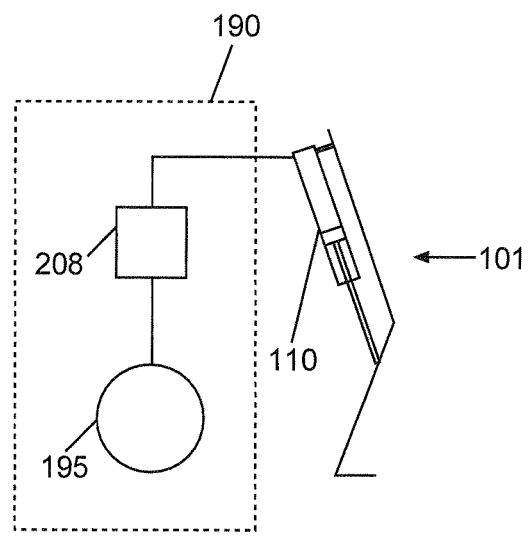
FIG. 36 is a schematic drawing of a knee hydraulic circuit of the present invention.

FIG. 36 shows an embodiment of the invention where knee hydraulic circuit 190 comprises a knee actuated flow-restricting valve 208 connecting right torque generator 110 to a hydraulic reservoir 195. In operation, knee actuated flow-restricting valve 208 restricts the fluid flow during stance phase and allows for minimum resistance fluid flow during the swing phase. Although one reservoir (i.e., reservoir 195) is used to hold hydraulic fluid for both hydraulic circuit 194 and knee hydraulic circuit 190, one can use separate hydraulic reservoirs for hydraulic circuit 194 and knee hydraulic circuit 190.

Figure 37:
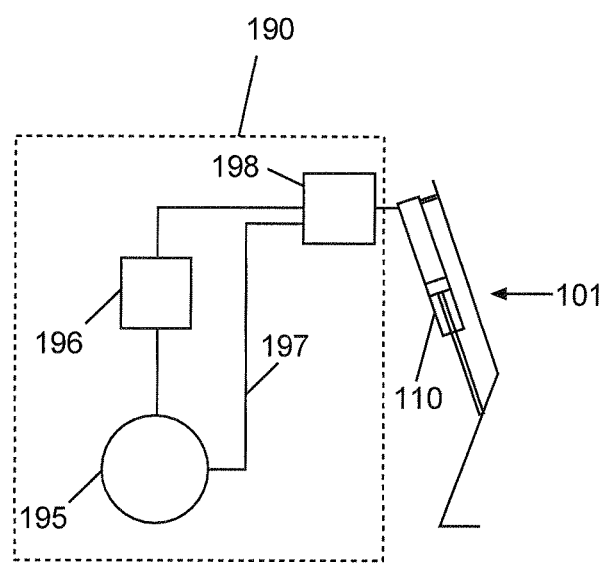
FIG. 37 is a schematic drawing of an alternative knee hydraulic circuit of the present invention including a three-way valve.

FIG. 37 shows an embodiment of the invention where knee hydraulic circuit 190 comprises a hydraulic three-way valve 198 connecting right torque generator 110 to a hydraulic reservoir 195, either through a non-actuated flow restricting valve 196 or a bypass line 197. Hydraulic three-way valve 198 connects right torque generator 110 to hydraulic reservoir 195 through non-actuated flow restricting valve 196 during stance phase, thereby restricting the hydraulic flow and increasing the impedance of right torque generator 110. During swing phase, hydraulic three-way valve 198 connects right torque generator 110 to hydraulic reservoir 195 through bypass line 197, thereby increasing the hydraulic fluid flow and decreasing the impedance of right torque generator 110.

Figure 38:
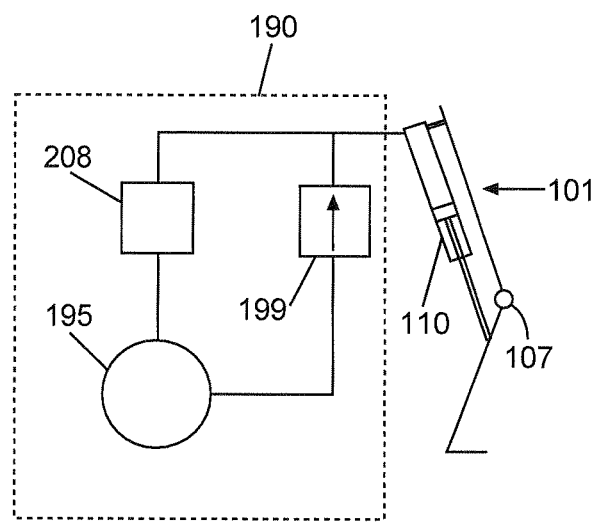
FIG. 38 is a schematic drawing of an alternative knee hydraulic circuit of the present invention including a check valve.

FIG. 38 represents another embodiment of knee hydraulic circuit 190, where a knee actuated flow-restricting valve 208 capable of controlling its orifice size and a check valve 199 connect torque generator 110 to hydraulic reservoir 195. In operation during the stance phase, signal processor 159 restricts the fluid flow by controlling the orifice of knee actuated flow-restricting valve 208. During swing phase, signal processor 159 opens knee actuated flow-restricting valve 208 and allows for fluid flow to torque generator 110 thereby decreasing the impedance of torque generator 110. Knee actuated flow-restricting valve 208 comprises any valve or combination of valves capable of performing the indicated functions. Examples of knee actuated flow-restricting valve 208 include, without limitation, flow control valves, pressure control valves and on-off valves. Check valve 199 allows right knee joint 107 to extend easily (no or minimum resistance) at all times.

Figure 39:
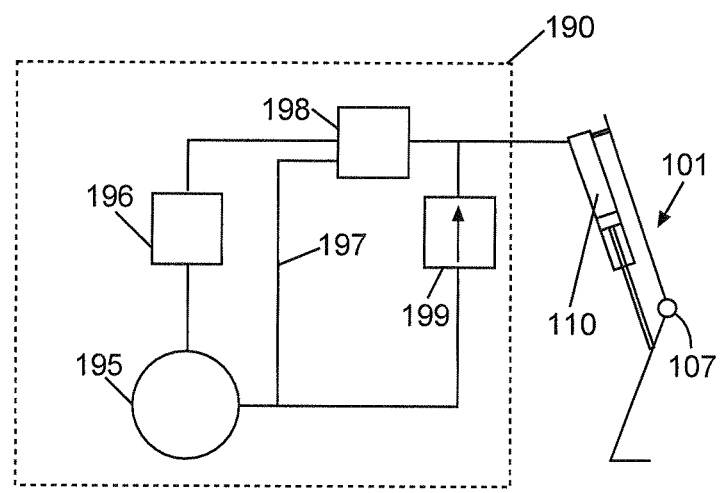
FIG. 39 is a schematic drawing of an alternative knee hydraulic circuit of the present invention including a three-way valve and a check valve.

FIG. 39 represents another embodiment of knee hydraulic circuit 190. This embodiment is similar to the embodiment of FIG. 37, but an additional check valve 199 has been added to allow right knee joint 107 to extend easily (no or minimum resistance) at all times.

Figure 40:
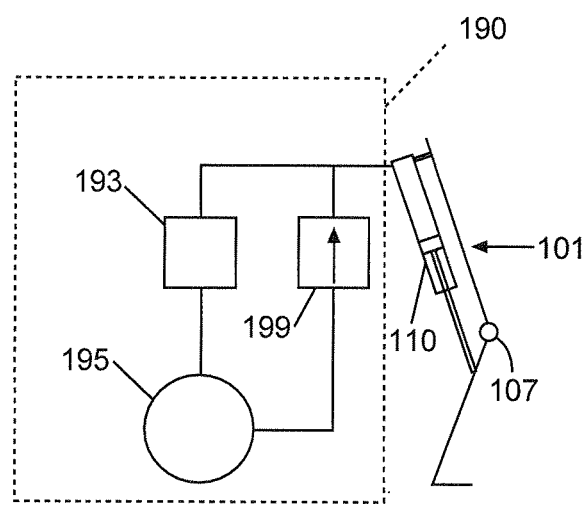
FIG. 40 is a schematic drawing of an alternative knee hydraulic circuit of the present invention including a two-way valve and a check valve.

FIG. 40 represents another embodiment of knee hydraulic circuit 190 where a two-way valve 193, capable of selecting between a set orifice size or fully open orifice, and check valve 199 connect torque generator 110 to hydraulic reservoir 195. During stance phase, signal processor 159 directs the fluid flow to torque generator 110 through the set orifice size of two-way valve 193. During swing phase, signal processor 159 directs the fluid flow to torque generator 110 through fully open orifice of two-way valve 193. Check valve 199 allows right knee joint 107 to extend easily (no or minimum resistance) at all times.

Figure 41:
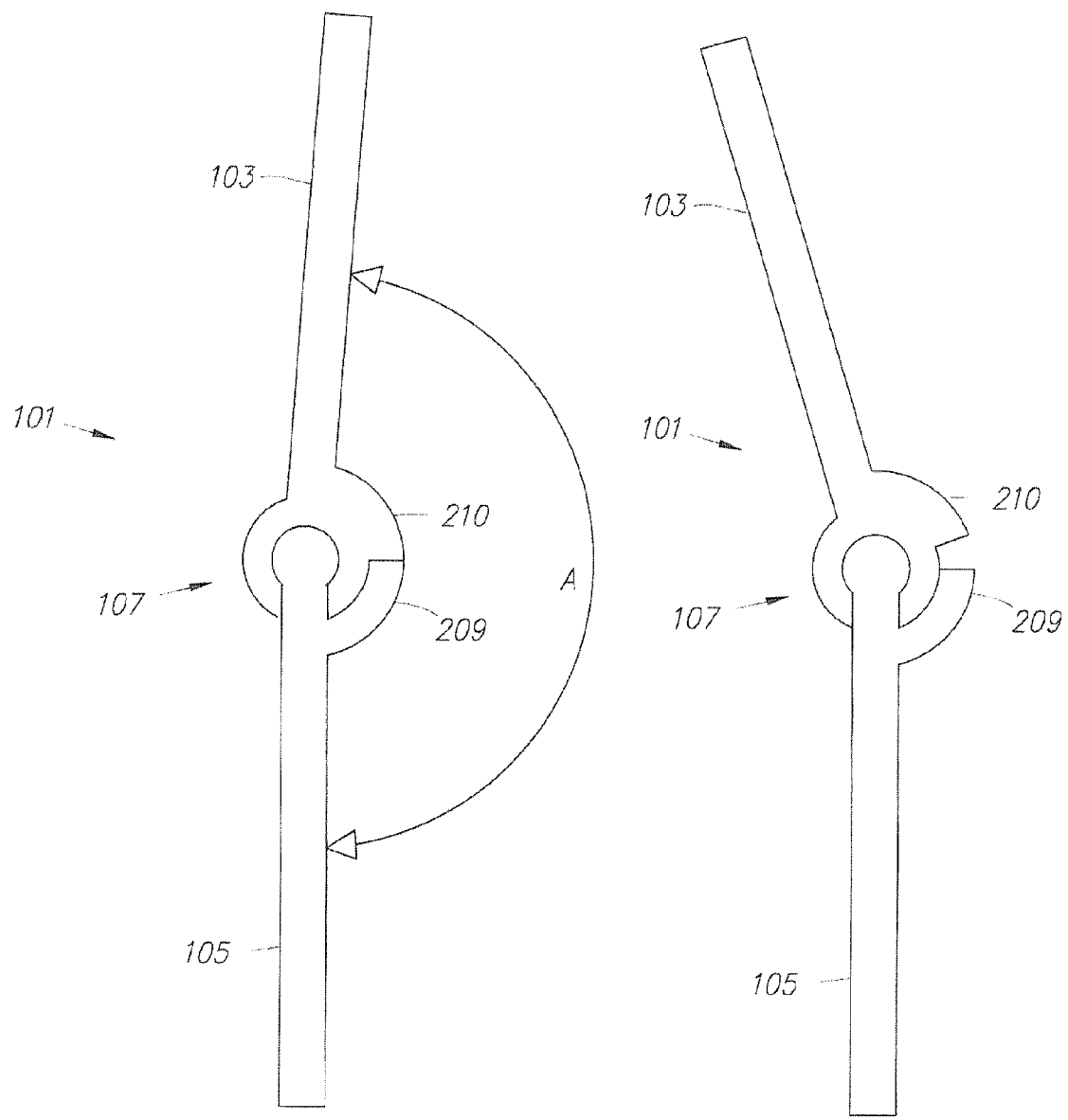
FIG. 41 depicts the function of a locking knee joint in accordance with the present invention.

In some embodiments, leg supports 101 and 102 are configured to allow flexion of the respective knee joints 107 and 108 during the swing phase and to resist flexion of the respective knee joints 107 and 108 during the stance phase by locking the knees. One such locking knee is shown in FIG. 41. FIG. 41 shows right leg support 101 in two configurations. In FIG. 41, right shank link 105 includes a shank stop 209, which bears on thigh stop 210 when the knee is hyperextended. The angle of right knee joint 107 at hyper-extension is illustrated as A in FIG. 41. Since this angle is less than 180 degrees, knee joint 107 or 108 will go "over-center" when approaching hyper-extension, meaning that the knee will tend to lock against the stops if leg supports 101 or 102 are subject to a compressive load, as would be the case for right leg support 101 in the situation illustrated in FIG. 41. One skilled in the art will note that there are many such over-center mechanisms, which generally tend to force the load vector on the leg support to pass in front of the knee joint.

Figure 42:
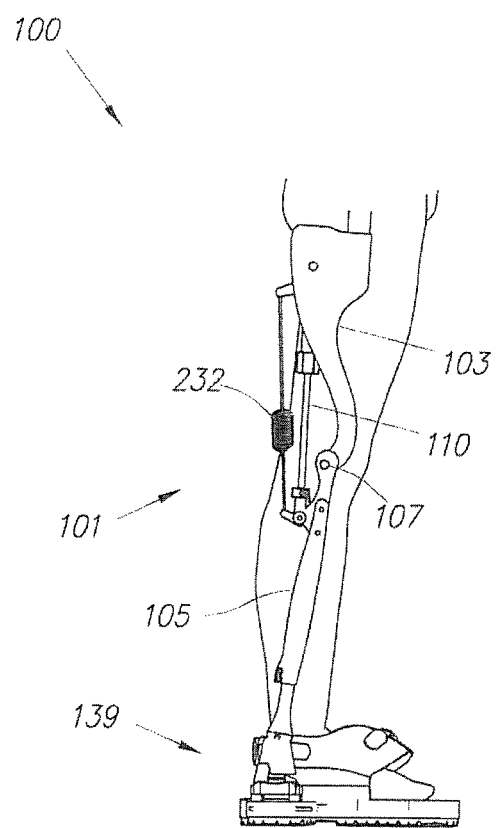
FIG. 42 is a side view of an alternative right leg support of the present invention including knee resilient elements in parallel with torque generators.
Figure 43:
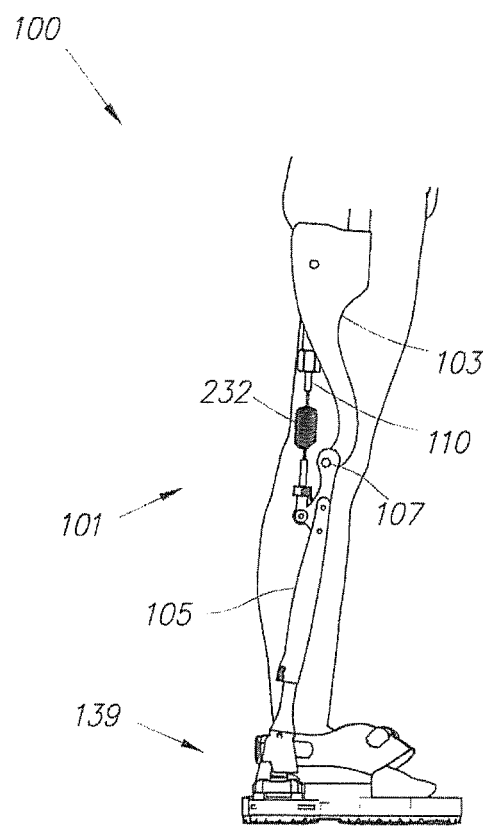
FIG. 43 is a side view of an alternative right leg support of the present invention including knee resilient elements in series with torque generators.

In some embodiments, lower extremity exoskeleton 100 further comprises knee resilient elements 232, which are configured to encourage flexion of knee joints 107 and 108. This decreases the person's effort needed to flex knee joints 107 and 108 during the swing phase. In some embodiments, as shown in FIG. 42, knee resilient elements 232 are in parallel with torque generators 110 and 111. In some embodiments, knee resilient elements 232, as shown in FIG. 43, are in series with torque generators 110 and 111. In some embodiment, lower extremity exoskeleton 100 comprises knee resilient elements 232, which are configured to encourage extension of knee joints 107 and 108. One skilled in the art will note that there are many methods and locations for installation of knee resilient element 232 to encourage flexion and/or extension of knee joints 107 and 108. It is further understood that knee resilient elements 232 can also be used with the embodiment of the exoskeleton shown in FIG. 41.

Figure 45:
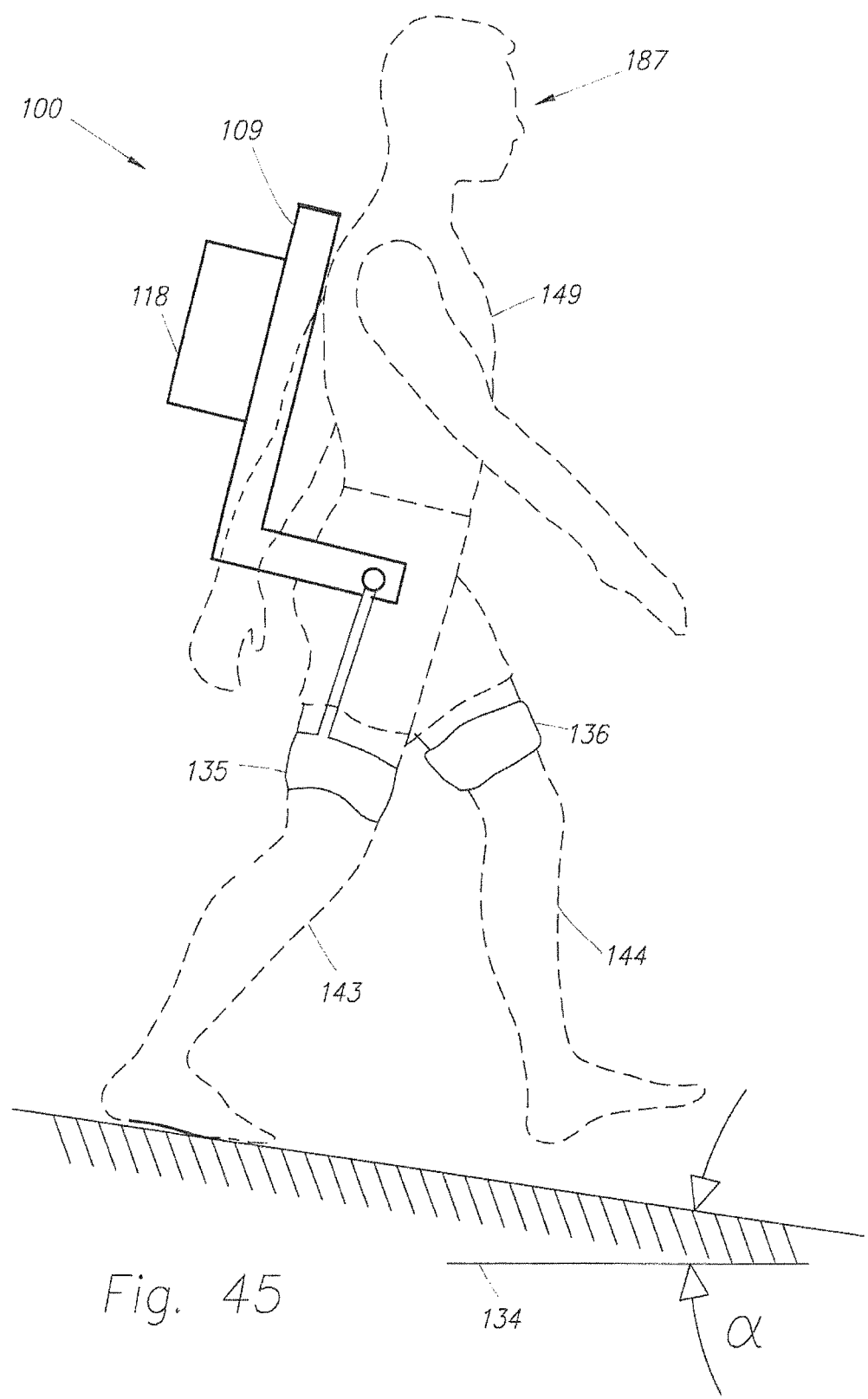
FIG. 45 is a side view of an alternative exoskeleton of the present invention including legs which do not touch the ground.

Although various exemplary embodiments have been described, it will be appreciated by persons skilled in the art that numerous variations and/or modifications may be made to the described device as specifically shown here without departing from the spirit or scope of that broader disclosure. For example, in general, the exoskeleton legs do not have to reach all the way to the ground in order to decrease the wearer's oxygen consumption. Any leg support including shank links only, as shown in FIG. 45, decrease its wearer's energy expenditure as long as the force from exoskeleton trunk onto the wearer's upper body is along the person's forward velocity. The mechanical energy transferred to the person during the stance phase will result in an incremental decrease in wearer's energy required for locomotion during the stance phase. An incremental decrease in wearer's energy required for locomotion leads to less oxygen consumption and a lower heart rate. The various examples are, therefore, to be considered in all respects as illustrative and not restrictive. In general, the invention is only intended to be limited by the scope of the following claims.

We claim:

1. An exoskeleton system comprising:
a trunk for coupling to a person;
leg supports for directly coupling to lower limbs of the person, with the leg supports including thigh links and shank links;
connections for directly coupling the thigh links or the shank links to the lower limbs of the person;
powered joints adapted to provide relative angular movement between the leg supports and the trunk;
a plurality of sensors designed to sense forces on the leg supports that are indicative of a stance;
a pair of foot members each adapted to support a foot of the person, wherein each shank link is rotatably connected to a respective said foot member;
ankle flexion resilient elements, with each ankle flexion resilient element being attached to a respective one of the foot members to resist rotation of the respective one of the foot members about a respective ankle plantardorsi flexion axis; and
a controller for receiving sensed signals from the plurality of sensors, said controller including an algorithm for identifying the stance from the sensed signals and actuating at least one of the powered joints to perform an action based on the stance.

2. The exoskeleton system of claim 1, wherein:
the powered joints are adapted to provide relative angular movement between the thigh links and the shank links and between the thigh links and the trunk.

3. The exoskeleton system of claim 2, wherein the plurality of sensors are designed to sense a force transferred by each of the leg supports to the ground.

4. The exoskeleton system of claim 2, wherein said plurality of sensors includes at least one foot sensor attached to the respective said foot member and configured to produce a stance signal representing a force on a bottom of the foot.

5. The exoskeleton system of claim 4, further comprising: at least one shoe positioned on the pair of foot members, wherein the at least one foot sensor is located inside the at least one shoe.

6. The exoskeleton system of claim 2, further comprising: a sensor provided on a respective said shank link and configured to produce a stance signal representing a force on a bottom portion of the respective said shank link.

7. The exoskeleton system of claim 1, wherein:
the leg supports includes a first leg support for a first lower limb of the person and a second leg support for a second lower limb of the person; and
the plurality of sensors comprises a first stance sensor provided on a first leg support and a second stance sensor provided on the second leg support.

8. The exoskeleton system of claim 1, wherein said plurality of sensors includes at least one sensor configured to produce a stance signal represented by a force on a bottom of a foot of the person.

9. The exoskeleton system of claim 1, wherein the connections directly couple the thigh links and the shank links to the lower limbs of the person.

10. An exoskeleton system comprising:
a trunk for coupling to a person;
leg supports for directly coupling to lower limbs of the person, with the leg supports including thigh links and shank links;
connections for directly coupling the thigh links or the shank links to the lower limbs of the person;
powered joints adapted to provide relative angular movement between the leg supports and the trunk;
a pair of foot members each adapted to support a foot of the person, wherein each shank link is rotatably connected to a respective said foot member;
a plurality of sensors designed to sense forces on the leg supports that are indicative of a stance, said plurality of sensors being constituted by force or pressure sensors, with multiple one of said plurality of sensors being provided at spaced locations on each of the foot members; and
a controller for receiving sensed signals from the plurality of sensors, identifying the stance based on a distribution of weight of the person between the leg supports and across the spaced locations on each of the foot members, and actuating at least one of the powered joints to perform an action based on the stance.

11. The exoskeleton system of claim 10, wherein the distribution of weight is indicative of the stance.

12. The exoskeleton system of claim 10, wherein said plurality of sensors are selected from the group consisting of: strain-gage force sensors, piezoelectric force sensors, force sensing resistors, pressure sensors and combinations thereof.

13. A method of controlling an exoskeleton system that includes a trunk for directly coupling to a person, leg supports including thigh links and shank links for coupling to lower limbs of the person, connections for directly coupling the thigh links or the shank links to the lower limbs of the person, a pair of foot members each adapted to support a foot of the person, powered joints adapted to provide relative angular movement between the leg supports and the trunk, a plurality of sensors constituted by force or pressure sensors and configured to sense forces on the leg supports that are indicative of a stance with multiple one of said plurality of sensors being provided at spaced locations on each of the foot members, and a controller for regulating the exoskeleton system based on signals from the plurality of sensors, the method comprising:
receiving sensed signals from said plurality of sensors;
identifying a stance from the sensed signals based on a distribution of weight of the person between the leg supports and across the spaced locations on each of the foot members; and
actuating at least one of the powered joints based on the stance to perform an action.

14. The method of claim 13, wherein identifying the stance comprises identifying a stance determined by the person.

15. The method of claim 13, wherein the stance comprises leaning on one leg and the action comprises actuating the powered joints of an opposing leg.

16. The method of claim 13, wherein the stance comprises leaning on one leg and the action comprises actuating the powered joints of the one leg.

17. The method of claim 13, wherein the stance comprises standing on two legs and the action comprises ending a current action.

18. The method of claim 17, wherein the stance comprises exerting a greater force on one of the two legs.

19. The method of claim 13, further comprising: computing a torque profile dependent upon an operational phase of the exoskeleton system based on signals from the plurality of sensors.

* * * * *